(12) United States Patent
Senba et al.

(10) Patent No.: US 8,265,774 B2
(45) Date of Patent: Sep. 11, 2012

(54) INVERTED PENDULUM TYPE MOVING BODY AND METHOD OF CONTROLLING THE SAME

(75) Inventors: Yoshiyuki Senba, Toyota (JP); Koji Yamada, Toyota (JP); Takashi Izuo, Toyota (JP); Takuya Serai, Toyota (JP); Mitsuo Koide, Nagoya (JP); Kazutoshi Sukigara, Nisshin (JP); Chisao Hayashi, Aichi-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 934 days.

(21) Appl. No.: 12/257,886

(22) Filed: Oct. 24, 2008

(65) Prior Publication Data

US 2009/0107240 A1 Apr. 30, 2009

(30) Foreign Application Priority Data

Oct. 24, 2007 (JP) ................................. 2007-276247

(51) Int. Cl.
*G05D 1/00* (2006.01)
*G06D 7/00* (2006.01)
(52) U.S. Cl. .................... 700/1; 701/22; 701/41; 701/69
(58) Field of Classification Search ........................ None
See application file for complete search history.

(56) References Cited

U.S. PATENT DOCUMENTS

| 3,399,742 | A | * | 9/1968 | Malick ............................ 180/21 |
| 4,054,319 | A | * | 10/1977 | Fogg et al. ..................... 297/466 |
| 5,701,965 | A | * | 12/1997 | Kamen et al. ................... 180/7.1 |
| 5,791,425 | A | * | 8/1998 | Kamen et al. ................... 180/7.1 |
| 5,794,730 | A | * | 8/1998 | Kamen .......................... 180/7.1 |
| 5,975,225 | A | * | 11/1999 | Kamen et al. ................... 180/7.1 |
| 6,223,104 | B1 | * | 4/2001 | Kamen et al. ....................... 701/1 |
| 6,288,505 | B1 | * | 9/2001 | Heinzmann et al. ........... 318/139 |
| 6,561,294 | B1 | * | 5/2003 | Kamen et al. ...................... 180/21 |
| 7,004,271 | B1 | * | 2/2006 | Kamen et al. ...................... 180/21 |
| 7,303,032 | B2 | * | 12/2007 | Kahlert et al. ............... 180/65.1 |
| 2006/0202439 | A1 | * | 9/2006 | Kahlert et al. .............. 280/47.24 |
| 2009/0115149 | A1 | * | 5/2009 | Wallis et al. ................. 280/6.159 |

FOREIGN PATENT DOCUMENTS

| JP | 2003-508285 A | 3/2003 |
| JP | 2004-295430 A | 10/2004 |
| JP | 2005-145293 A | 6/2005 |
| JP | 2006-205839 A | 8/2006 |
| JP | 2006-306374 A | 11/2006 |
| JP | 2006-306375 a | 11/2006 |
| JP | 2007-011634 A | 1/2007 |
| JP | 2007-203965 A | 8/2007 |
| WO | WO 2006/031917 A1 | 3/2006 |

* cited by examiner

*Primary Examiner* — Khoi Tran
*Assistant Examiner* — Bhavesh V Amin
(74) *Attorney, Agent, or Firm* — Kenyon & Kenyon LLP

(57) ABSTRACT

An inverted pendulum type moving body according to the present invention includes: first actuators that rotationally drive wheels each disposed on an axle; and a turning motion control portion that controls the first actuators when the inverted pendulum type moving body comes into contact with an obstacle so as to allow the inverted pendulum type moving body to perform a turning motion.

38 Claims, 10 Drawing Sheets

INVERTED PENDULUM TYPE MOVING BODY AND METHOD OF CONTROLLING THE SAME

BACKGROUND OF THE INVENTION

1. Field of the Invention

The present invention relates to an inverted pendulum type moving body and a method of controlling the same.

2. Description of Related Art

An inverted pendulum type moving body travels on a plain surface while being maintained in an inverted state. In this case, the inverted pendulum type moving body drives left and right driving wheels to control the moving body to be maintained in the inverted state by correcting the position of the center of mass of the body so that the position of the center of mass is positioned vertically upward of an axle. For example, Japanese Unexamined Patent Application Publication No. 2005-145293 (Kaneko et al.) discloses a technology in which an inverted two-wheel carriage robot, which includes a control system that integrally performs inversion control and position control, is allowed to travel along a path set in advance.

When the inverted pendulum type moving body collides with an obstacle during traveling and cannot cross over the obstacle, the wheels cannot be driven in a traveling direction any more. As a result, when the moving body collides with the obstacle, a force (impact reaction) is generated in a direction opposite to the traveling direction of the wheels. When the wheels stop rotating due to the impact reaction, a force for driving the wheels is applied to the body as a drive reaction, and the drive reaction causes the body of the inverted pendulum type moving body to rotate significantly backward. In this case, in the conventional inverted pendulum type moving body, the wheels are driven in the direction opposite to the traveling direction (that is, backward) so that the position of the center of mass of the body, which rotates backward, is located vertically upward of the axle, thereby maintaining the moving body in the inverted state.

In this case, however, when the wheels are driven backward so as to maintain the moving body in the inverted state, a forward torque is generated with respect to the body. As a result, the inverted pendulum type moving body further drives the wheels forward so that forward rotation of the body is cancelled out, to thereby maintain the moving body in the inverted state. Thus, the inverted pendulum type moving body receives the torque in a front-back direction due to a disturbance caused by a contact with an obstacle, and then swings significantly in the front-back direction so as to maintain the moving body in the inverted state against the disturbance. For this reason, a passenger of the inverted pendulum type moving body is caused to swing significantly in the front-back direction. In particular, because a backside area is a dead area for the passenger, the backward swing gives the passenger an extremely uneasy feeling. Further, because the moving body cannot be maintained in the inverted state depending on the magnitude of the impact, the backward swing is dangerous.

Meanwhile, Japanese Patent Translation Publication No. 2003-508285 (Dean L. Kamen et al.) discloses an inverted pendulum type moving body that performs inverted control using a control arm.

The technology disclosed in Dean L. Kamen et al. enables stable control of the inverted pendulum type moving body by supporting a passenger with the control arm, but has a problem in that it is difficult for the moving body to avoid an obstacle safely when the moving body collides with an obstacle.

The present invention has been made to solve the above-mentioned problems, and therefore an object of the present invention is to provide an inverted pendulum type moving body capable of avoiding an obstacle safely when the inverted pendulum type moving body comes into contact with an obstacle, and a method of controlling the same.

SUMMARY OF THE INVENTION

According to a first aspect of the present invention, there is provided an inverted pendulum type moving body including: first actuators to rotationally drive at least two wheels each disposed on an axle; and a turning motion control portion to control the first actuators when the inverted pendulum type moving body comes into contact with an obstacle so as to allow the inverted pendulum type moving body to perform a turning motion.

In this structure, a forward and backward rocking motion caused by a reaction generated due to the contact is avoided by the turning motion, which results in a reduction in unstable operations occurring when the moving body comes into contact with the obstacle. Accordingly, even when the moving body collides with the obstacle, it is possible to safely avoid the obstacle without causing the passenger to swing significantly. Further, when the moving body is caused to turn to a position/posture to be substantially in parallel to the obstacle, the obstacle is not present at a forward position in the traveling direction of the moving body. Thus, the moving body can easily perform the control for maintaining the moving body in the inverted state in a front-back direction about an axis parallel to the ground, after colliding with the obstacle. Furthermore, since the obstacle is not present in front of the moving body, the moving body can start moving immediately after the inverted state of the moving body becomes stable.

Further, the inverted pendulum type moving body may include a turning motion calculation portion to calculate a forward and backward rocking motion generated due to the contact between the inverted pendulum type moving body and the obstacle, as a corresponding turning motion with respect to a direction in which the inverted pendulum type moving body turns. Further, the turning motion control portion may drive and control the first actuators to perform the turning motion so as to allow the inverted pendulum type moving body to turn. In this structure, the inverted pendulum type moving body is caused to turn in the direction in which the forward and backward rocking motion generated due to the contact is cancelled out, thereby making it possible to effectively reduce unstable operations occurring when the moving body comes into contact with the obstacle. As a result, even when the moving body collides with the obstacle, the moving body can avoid the obstacle safely without causing the passenger to swing significantly.

Further, the turning motion calculation portion may calculate the turning motion based on an output of a sensor to measure variations that vary in accordance with a distance in a traveling direction between a position of the axle of each of the wheels and a position of a center of mass of an upper body portion of the inverted pendulum type moving body. As a result, the turning motion can be calculated with higher accuracy.

The inverted pendulum type moving body may further include: second actuators to drive an upper body portion of the inverted pendulum type moving body to vary a position of a center of mass of the upper body portion with respect to a position of the axle; and a posture control portion to control the second actuators to incline the upper body portion so that a side of a turning center becomes lower than a ground surface on which the wheels are located. In this structure, a centrifugal force generated due to the turning motion is cancelled out, thereby enabling the moving body to turn safely. Furthermore, the turning radius can be made smaller, thereby enabling the moving body to turn swiftly.

According to a second aspect of the present invention, there is provided an inverted pendulum type moving body including: first actuators to rotationally drive at least two wheels each disposed on an axle; second actuators to rotationally drive an upper body portion of the inverted pendulum type moving body at a position of a center of mass of the upper body portion about an axis parallel to the axle; a rotational motion calculation portion to calculate a forward and backward rocking motion of the inverted pendulum type moving body, which is generated due to a contact between the inverted pendulum type moving body and the obstacle, as a corresponding rotational motion of the upper body portion about the axis parallel to the axle of the inverted pendulum type moving body; and a rotational motion control portion to drive and control the second actuators to allow the upper body portion to perform the rotational motion so that the forward and backward rocking motion is cancelled out by the rotational motion.

In this structure, the upper body portion of the inverted pendulum type moving body is allowed to perform the rotational motion in the direction in which the forward and backward rocking motion generated due to the contact is cancelled out, thereby making it possible to effectively reduce unstable operations occurring when the moving body comes into contact with the obstacle. Accordingly, even when the moving body collides with the obstacle, the moving body can avoid the obstacle safely without causing the passenger to swing significantly.

Further, the rotational motion calculation portion may calculate the rotational motion based on an output of a sensor to measure variations that vary in accordance with a distance in a traveling direction between a position of the axle of each of the wheels and the position of the center of mass of the upper body portion. As a result, the rotational motion can be calculated with higher accuracy.

According to a third aspect of the present invention, there is provided an inverted pendulum type moving body including: first actuators to rotationally drive at least two wheels each disposed on an axle; second actuators to translationally drive an upper body portion of the inverted pendulum type moving body at a position of a center of mass of the upper body portion in a direction orthogonal to the axle; a translational motion calculation portion to calculate a forward and backward rocking motion of the inverted pendulum type moving body, which is generated due to a contact between the inverted pendulum type moving body and an obstacle, as a corresponding translational motion of the upper body portion in a direction orthogonal to the axle of the inverted pendulum type moving body; and a translational motion control portion to drive and control the second actuators to allow the upper body portion to perform the translational motion so that the forward and backward rocking motion is cancelled out by the translational motion.

In this structure, the upper body portion of the inverted pendulum type moving body is allowed to perform the translational motion in the direction in which the forward and backward rocking motion generated due to the contact is cancelled out, thereby making it possible to effectively reduce the unstable operations occurring when the moving body comes into contact with an obstacle. As a result, even when the moving body collides with the obstacle, the moving body can avoid the obstacle safely without causing the passenger to swing significantly.

Further, the translational motion calculation portion may calculate the translational motion based on an output of a sensor to measure variations that vary in accordance with a distance in a traveling direction between a position of the axle of each of the wheels and the position of the center of mass of the upper body portion. As a result, the translational motion can be calculated with higher accuracy.

According to a fourth aspect of the present invention, there is provided an inverted pendulum type moving body including: first actuators to rotationally drive at least two wheels each disposed on an axle; second actuators to allow an upper body portion of the inverted pendulum type moving body to perform one of rotation and translational driving at a position of a center of mass of the upper body portion in at least one of a direction about an axis parallel to the axle and a direction orthogonal to the axle; a rotational motion calculation portion to calculate a forward and backward rocking motion of the inverted pendulum type moving body, which is generated due to a contact between the inverted pendulum type moving body and an obstacle, as a corresponding rotational motion of the upper body portion about the axis parallel to the axle of the inverted pendulum type moving body; a rotational motion control portion to drive and control the second actuators to allow the upper body portion to perform the rotational motion so that the forward and backward rocking motion is cancelled out by the rotational motion; a translational motion calculation portion to calculate the forward and backward rocking motion of the inverted pendulum type moving body, which is generated due to the contact, as a corresponding translational motion of the upper body portion in the direction orthogonal to the axle of the inverted pendulum type moving body; and a translational motion control portion to drive and control the second actuators to allow the upper body portion to perform the translational motion so that the forward and backward rocking motion is cancelled out by the translational motion.

In this structure, the upper body portion of the inverted pendulum type moving body is allowed to perform rotation or translational motion in the direction in which the forward and backward rocking motion generated due to the contact is cancelled out, thereby making it possible to effectively reduce the unstable operations occurring when the moving body comes into contact with the obstacle. As a result, even when the moving body collides with the obstacle, the moving body can avoid the obstacle safely without causing the passenger to swing significantly.

Further, the sensor may be a gyro-sensor that detects an inclination angle velocity of the upper body portion as the variations. As a result, the inclination angle velocity of the inverted pendulum type moving body can be detected with high response.

Further, the inverted pendulum type moving body may include a contact determination portion that determines whether the inverted pendulum type moving body comes into contact with the obstacle. As a result, a timing at which the moving body comes into contact with the obstacle can be specified and avoidance control can be performed according to the contact timing, with the result that the moving body can avoid the obstacle more safely.

Further, the contact determination portion may determine the contact based on an output of an encoder to measure a current position of the inverted pendulum type moving body based on a rotation amount of the wheels. As a result, it is possible to determine the contact with higher accuracy based on the current position of the inverted pendulum type moving body.

According to a fifth aspect of the present invention, there is provided a method of controlling an inverted pendulum type moving body to rotationally drive at least two wheels each disposed on an axle, including allowing the inverted pendulum type moving body to turn when the inverted pendulum type moving body comes into contact with an obstacle.

In this method, the forward and backward rocking motion caused by the reaction generated due to the contact is avoided by the turning motion, which results in a reduction in unstable operations occurring when the moving body comes into contact with the obstacle. As a result, even when the moving body collides with the obstacle, the moving body can avoid the obstacle safely without causing the passenger to swing significantly. Further, when the moving body is allowed to turn to the position/posture to be substantially in parallel to the obstacle, the obstacle is not present at a forward position in the traveling direction of the moving body. Accordingly, after colliding with the obstacle, the moving body can easily perform control for maintaining the moving body in the inverted state in the front-back direction about the axis parallel to the ground. Furthermore, since the obstacle is not present in front of the moving body, the moving body can start moving immediately after the inverted state of the moving body becomes stable.

Further, when the inverted pendulum type moving body comes into contact with the obstacle, a forward and backward rocking motion generated due to a contact between the inverted pendulum type moving body and the obstacle may be calculated as a corresponding turning motion in a direction in which the inverted pendulum type moving body turns. In addition, the inverted pendulum type moving body may be allowed to turn so as to perform the turning motion. In this case, the inverted pendulum type moving body is allowed to turn in the direction in which the forward and backward rocking motion generated due to the contact is cancelled out, thereby making it possible to effectively reduce the unstable operations occurring when the moving body comes into contact with the object. Accordingly, even when the moving body collides with the obstacle, the moving body can avoid the obstacle more safely without causing the passenger to swing significantly.

Further, variations that vary in accordance with a distance in a traveling direction between a position of the axle of each of the wheels and a position of a center of mass of an upper body portion of the inverted pendulum type moving body may be measured. In addition, the turning motion may be calculated based on the output of the variations measured. As a result, the turning motion can be calculated with higher accuracy.

Further, the upper body portion of the inverted pendulum type moving body may be driven and the position of the center of mass of the upper body portion may be varied with respect to the position of the axle to incline the upper body portion so that a side of a turning center becomes lower than a ground surface on which the wheels are located. As a result, the moving body can turn stably by cancelling the centrifugal force generated due to the turning motion. Furthermore, the turning radius can be made smaller, thereby enabling the moving body to turn swiftly.

According to a sixth embodiment of the present invention, there is provided a method of controlling an inverted pendulum type moving body to rotationally drive at least two wheels each disposed on an axle and to rotationally drive an upper body portion of the inverted pendulum type moving body at a position of a center of mass of the upper body portion about an axis parallel to the axle, the method including: calculating a forward and backward rocking motion of the inverted pendulum type moving body, which is generated due to a contact between the inverted pendulum type moving body and an obstacle, as a corresponding rotational motion of the upper body portion about the axis parallel to the axle of the inverted pendulum type moving body; and allowing the upper body portion of the inverted pendulum type moving body to perform the rotational motion at the position of the center of mass of the upper body portion about the axis parallel to the axle so that the forward and backward rocking motion is cancelled out by the rotational motion.

In this method, the upper body portion of the inverted pendulum type moving body is allowed to perform the rotational motion in the direction in which the forward and backward rocking motion generated due to the contact is cancelled out, thereby making it possible to effectively reduce the unstable operations occurring when the moving body comes into contact with the object. As a result, even when the moving body collides with the obstacle, the moving body can avoid the obstacle without causing the passenger to swing significantly.

Further, in the calculation of the rotational motion, the rotational motion may be calculated based on an output of a sensor to measure variations that vary in accordance with a distance in a traveling direction between a position of the axle of each of the wheels and the position of the center of mass of the upper body portion. As a result, the rotational motion can be calculated with higher accuracy.

According to a seventh embodiment of the present invention, there is provided a method of controlling an inverted pendulum type moving body to rotationally drive at least two wheels each disposed on an axle and to allow an upper body portion of the inverted pendulum type moving body at a position of a center of mass of the upper body portion in a direction orthogonal to the axle, the method including: calculating a forward and backward rocking motion of the inverted pendulum type moving body, which is generated due to a contact between the inverted pendulum type moving body and an obstacle, as a corresponding translational motion of the upper body portion in the direction orthogonal to the axle of the inverted pendulum type moving body; and allowing the upper body portion of the inverted pendulum type moving body to perform the translational motion in the direction orthogonal to the axle so that the forward and backward rocking motion is cancelled out by the translational motion.

In this method, the upper body portion of the inverted pendulum type moving body is allowed to perform rotation or translational motion in the direction in which the forward and backward rocking motion generated due to the contact is cancelled out, thereby making it possible to effectively reduce the unstable operations occurring when the moving body comes into contact with the object. As a result, even when the moving body collides with the obstacle, the moving body can avoid the obstacle without causing the passenger to swing significantly.

Further, in the calculation of the translational motion, the translational motion may be calculated based on an output of a sensor that measures variations that vary in accordance with a distance in a traveling direction between a position of the axle of each of the wheels and the position of the center of mass of the upper body portion. As a result, the translational motion can be calculated with higher accuracy.

According to an eighth aspect of the present invention, there is provided a method of controlling an inverted pendulum type moving body to rotationally drive at least two wheels each disposed on an axle and to allow an upper body portion of the inverted pendulum type moving body to perform one of rotation and translational driving at a position of a center of mass of the upper body portion in at least one of a direction about an axis parallel to the axle and a direction orthogonal to the axle, the method including: calculating a forward and backward rocking motion of the inverted pendulum type moving body, which is generated due to a contact between the inverted pendulum type moving body and an obstacle, as a corresponding rotational motion of the upper body portion about the axis parallel to the axle of the inverted pendulum type moving body; allowing the upper body portion of the inverted pendulum type moving body to perform the rotational motion at the position of the center of mass of the upper body portion about the axis parallel to the axle so that the forward and backward rocking motion is cancelled out by the rotational motion; calculating the forward and backward rocking motion of the inverted pendulum type moving body, which is generated due to the contact, as a corresponding translational motion of the upper body portion in the direction orthogonal to the axle of the inverted pendulum type moving body; and allowing the upper body portion of the inverted pendulum type moving body to perform the translational motion at the position of the center of mass of the upper body portion in the direction orthogonal to the axle so that the forward and backward rocking motion is cancelled out by the translational motion.

In this method, the upper body portion of the inverted pendulum type moving body is allowed to perform rotation or translational motion in the direction in which the forward and backward rocking motion generated due to the contact is cancelled out, thereby making it possible to effectively reduce the unstable operations occurring when the moving body comes into contact with the object. As a result, even when the moving body collides with the obstacle, the moving body can avoid the obstacle without causing the passenger to swing significantly.

Further, the inclination angle of the upper body portion may be detected as the variations. As a result, the inclination angle velocity of the inverted pendulum type moving body can be detected with high response.

Further, the method of controlling an inverted pendulum type moving body may include determining whether the inverted pendulum type moving body comes into contact with the obstacle. Thus, the timing at which the moving body comes into contact with the obstacle can be specified, and the control can be performed according to the contact timing. As a result, the moving body can avoid the obstacle more safely.

Further, the current position of the inverted pendulum type moving body may be measured based on a rotation amount of the wheels, and the contact may be determined based on the current position measured. As a result, it is possible to determine the contact with higher accuracy based on the current position of the inverted pendulum type moving body.

It is an object of the present invention to provide an inverted pendulum type moving body capable of avoiding an obstacle safely when the inverted pendulum type moving body comes into contact with an obstacle, and a method of controlling the same.

The above and other objects, features and advantages of the present invention will become more fully understood from the detailed description given hereinbelow and the accompanying drawings which are given by way of illustration only, and thus are not to be considered as limiting the present invention.

DESCRIPTION OF THE PREFERRED EMBODIMENTS

First Embodiment

A moving body according to a first embodiment of the present invention is an inverted pendulum type moving body. Accordingly, the moving body moves to a desired position/posture by driving wheels that contact with the ground. Further, the moving body is capable of maintaining an inverted state by driving the wheels.

Figure 1:
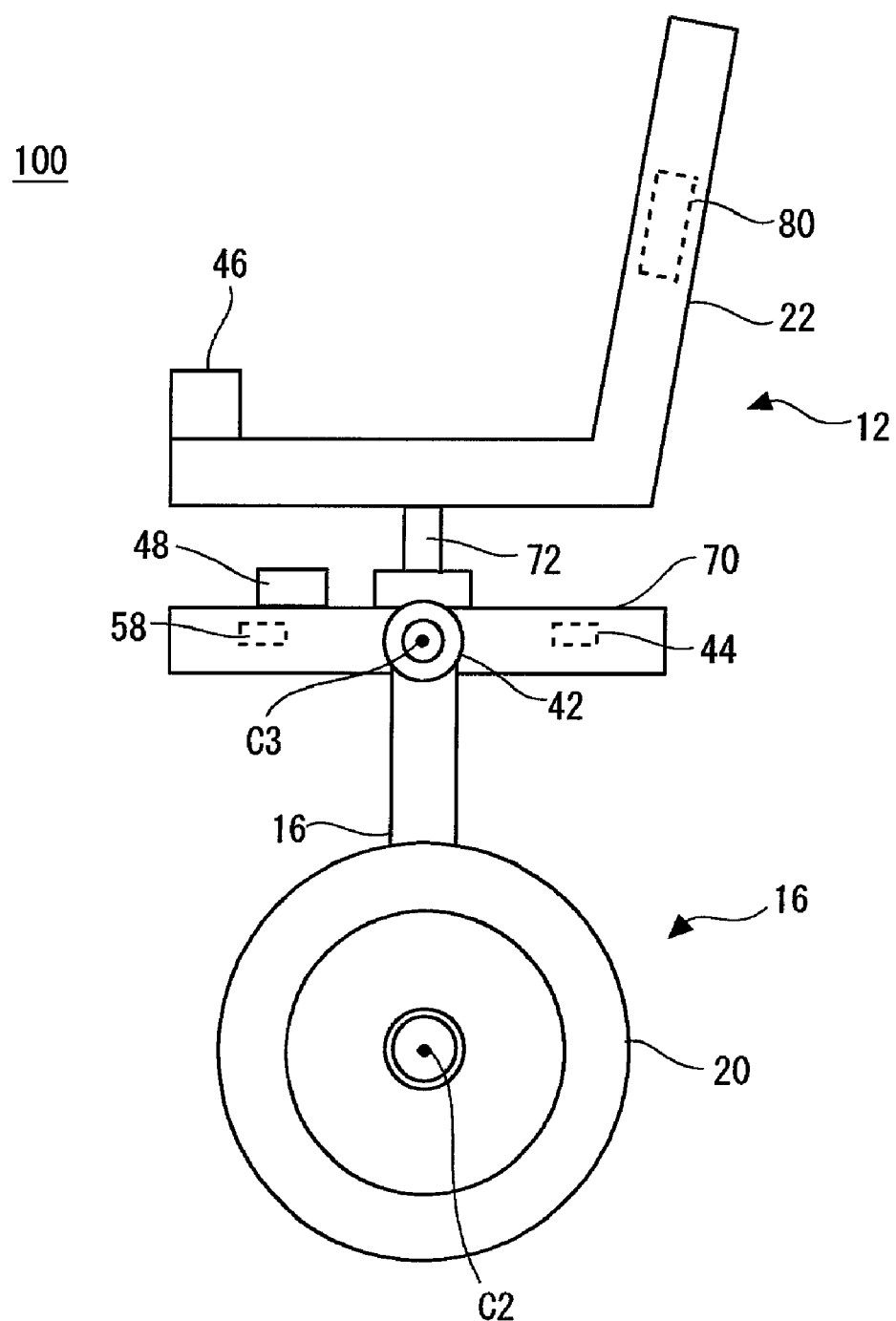
FIG. 1 is a side view showing the structure of a moving body according to an embodiment of the present invention.
Figure 2:
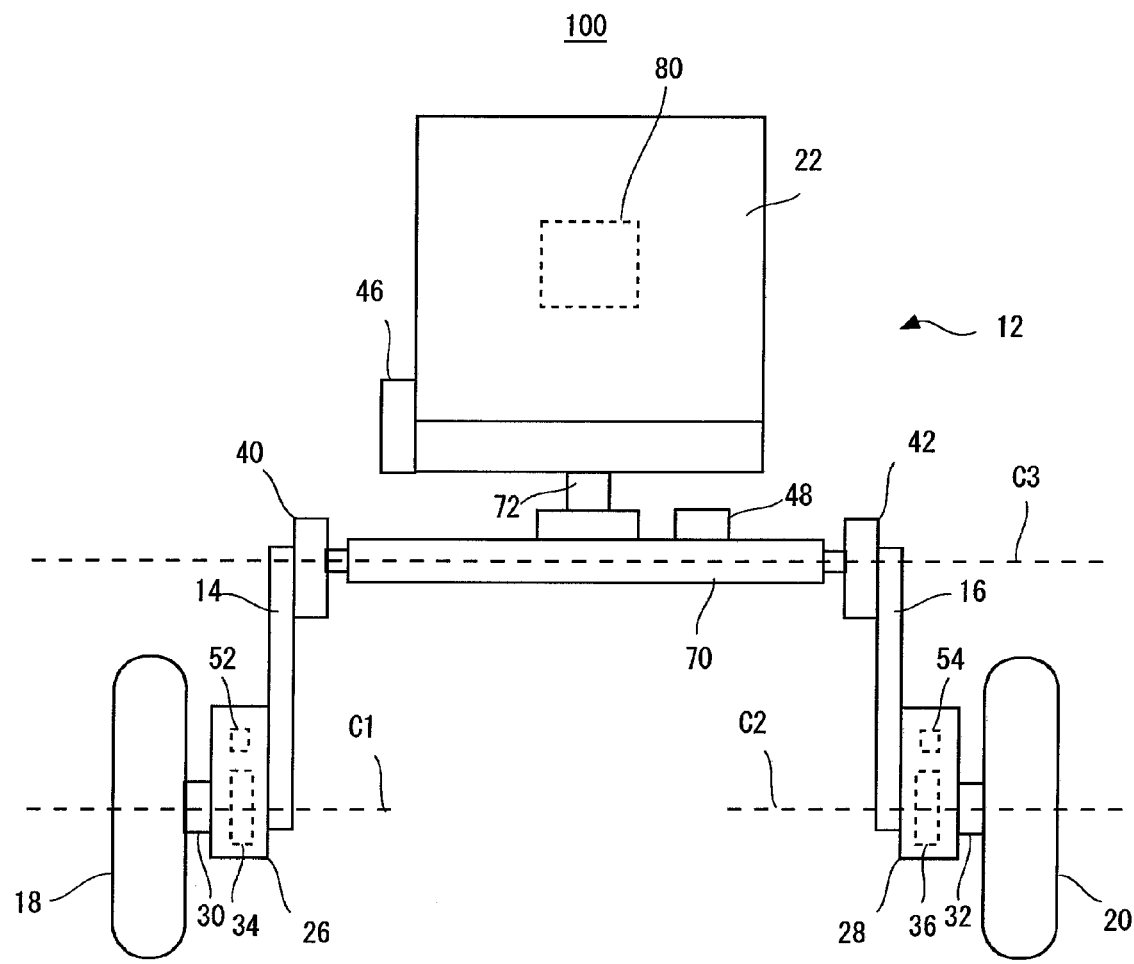
FIG. 2 is a front view showing the structure of the moving body according to the embodiment of the present invention.

Referring to FIGS. 1 and 2, the structure of a moving body 100 according to the first embodiment of the present invention will be described. FIG. 1 is a side view schematically showing the structure of the moving body 100. FIG. 2 is a front view schematically showing the structure of the moving body 100. Referring to FIG. 2, the moving body 100 is an inverted wheel type moving body (traveling body), and includes a right driving wheel 18, a left driving wheel 20, a right rod 14, a left rod 16, and a body 12. The body 12 is an upper body portion of the moving body 100.

On the side surface side of the right rod 14, the right driving wheel 18 that contacts with the ground is provided through a right mount 26. On the side surface side of the left rod 16, the left driving wheel 20 that contacts with the ground is provided through a left mount 28. The moving body 100 moves by the rotation of the right driving wheel 18 and the left driving wheel 20.

Between the right driving wheel 18 and the right rod 14, the right mount 26 is disposed. The right mount 26 is fixed to the side end of the right rod 14. The right mount 26 rotatably supports the right driving wheel 18 through an axle 30. The right driving wheel 18 is fixed to a rotation axis C1 of a right wheel drive motor 34 through the axle 30. The right wheel drive motor 34 is fixed into the right mount 26, and functions as an actuator for the wheel. In short, the right wheel drive motor 34 rotationally drives the right driving wheel 18. Between the left driving wheel 20 and the left rod 16, the left mount 28 is disposed. The left mount 28 is fixed to the side end of the left rod 16. The left mount 28 rotatably supports the left driving wheel 20 through an axle 32.

The left driving wheel 20 is fixed to a rotation axis C2 of a left wheel drive motor 36 through the axle 32. The left wheel drive motor 36 is fixed into the left mount 28, and functions an actuator for the wheel. In short, the left wheel drive motor 36 rotationally drives the left driving wheel 20. The right wheel drive motor 34 and the left wheel drive motor 36 serving as first actuators are, for example, servomotors. The actuators for the wheels are not limited to electrical motors, and actuators using air pressure or oil pressure may also be used.

The right mount 26 further includes a right wheel encoder 52. The right wheel encoder 52 detects the rotation angle of the right driving wheel 18 as the rotation amount of the right driving wheel 18. The left mount 28 includes a left wheel encoder 54. The left wheel encoder 54 detects the rotation angle of the left driving wheel 20 as the rotation amount of the left driving wheel 20.

The right rod 14 is mounted to the side end of the right driving wheel 18 through the right mount 26. The longitudinal direction of the right rod 14 is perpendicular to the rotation axis C1. The body 12 is mounted to the upper end of the right rod 14 through a right posture controlling actuator 40. In short, the right rod 14 functions as a link that connects the body 12 with the right driving wheel 18. Thus, the lower end side of the right rod 14 is connected to the rotation axis C1 of the right driving wheel 18, and the upper end side thereof is connected to a rotation axis C3 of the body 12. The body 12 is rotatably supported with respect to the rotation axis C1 through the right rod 14. The left rod 16 is mounted to the side end of the left driving wheel 20 through the left mount 28. The longitudinal direction of the left rod 16 is perpendicular to the rotation axis C2. The body 12 is mounted to the upper end of the left rod 16 through a left posture controlling actuator 42. In short, the left rod 16 is a link that connects the body 12 with the left driving wheel 20. Thus, the lower end side of the left rod 16 is connected to the rotation axis C2 of the left driving wheel 20, and the upper end side thereof is connected to the rotation axis C3 of the body 12. The body 12 is rotatably supported with respect to the rotation axis C2 through the left rod 16. In this case, the right rod 14 and the left rod 16 serve as support members that rotationally support the body 12 with respect to the rotation axes C1 and C2. Further, the body 12 which is the upper body portion of the moving body 100 is disposed above the right rod 14 and the left rod 16.

The right rod 14 and the left rod 16 are provided on the inner side of the right driving wheel 18 and the left driving wheel 20, respectively. In other words, the moving body 100 includes two rods, that is, the right rod 14 and the left rod 16 which are provided so as to correspond to the left wheel and the right wheel, respectively. The right rod 14 and the left rod 16 are mounted with the right posture controlling actuator 40 and the left posture controlling actuator 42, respectively. The right posture controlling actuator 40 and the left posture controlling actuator 42 vary the angles of the right rod 14 and the left rod 16, respectively, with respect to the body 12. The posture controlling actuators 40 and 42 serving as second actuators are, for example, servomotors that control the posture angle of the body 12. Note that kinetic power of the motors may be transmitted through gears, belts, pulleys, and the like.

The body 12 includes a pedestal 70, a column 72, a gyro-sensor 48, and a passenger seat 22. The flat-plate like pedestal 70 is mounted to the right rod 14 and the left rod 16 through the right posture controlling actuator 40 and the left posture controlling actuator 42, respectively. The right rod 14 and the left rod 16 are provided at the opposing side surfaces of the pedestal 70. In short, the pedestal 70 is disposed between the right rod 14 and the left rod 16.

When the right posture controlling actuator 40 and the left posture controlling actuator 42 are driven, the angle of the pedestal 70 with respect to the right rod 14 and the left rod 16 varies. Thus, the pedestal 70 can be rotated back and forth with the rotation axis C3 being as a rotation center, and the pedestal 70 can be rotated in the front-back direction about the rotation axis in parallel to the ground. The rotation axis C3 is parallel to the axles C1 and C2 and positioned above the axles C1 and C2. The right rod 14 is provided between the rotation axis C3 and the rotation axis C1. The left rod 16 is provided between the rotation axis C3 and the rotation axis C2. The right posture controlling actuator 40 and the left posture controlling actuator 42 are provided on the rotation axis C3. In short, the right rod 14 and the left rod 16 serve as swing arms that control the posture.

Further, when the right posture controlling actuator 40 and the left posture controlling actuator 42 are driven, the angles of the right rod 14 and the left rod 16 with respect to the pedestal 70 vary. Thus, the pedestal 70 can be inclined in a lateral direction with respect to the axis perpendicular to the rotation axis C3. In other words, the body 12 of the moving body 100 can be swung and inclined autonomously in a roll direction (about anterior-posterior axis of moving body 100 in parallel to longitudinal traveling direction). More specifically, for example, only the right posture controlling actuator 40 is driven to allow the right rod 14 to rotate forward with respect to the pedestal 70. As a result, the pedestal 70 is inclined so that the side of the right driving wheel 18 becomes lower.

As a matter of course, the right rod 14 may be rotated backward, and the right rod 14 may be rotated in any direction. In other words, at least one of the rods may be driven in the front-back direction so as to incline the rotation axis C3 of the pedestal 70, or the rods may be driven in an arbitrary direction. As described above, when the right posture controlling actuator 40 and the left posture controlling actuator 42 are driven, the posture of the body 12 varies in the front-back direction and the lateral direction.

The pedestal 70 contains a battery module 44 and an obstacle detection sensor 58. The obstacle detection sensor 58 is an optical obstacle detection sensor that outputs a detection signal upon detection of an obstacle in front of the moving body 100. The battery module 44 supplies electrical power to the right wheel drive motor 34, the left wheel drive motor 36, the right posture controlling actuator 40, the left posture controlling actuator 42, a control portion 80, and the like.

The gyro-sensor 48 is provided on the pedestal 70 of the body 12. The gyro-sensor 48 detects an angular velocity with respect to the inclination angle of the body 12. In this case, the term "inclination angle of the body 12" means the degree of the inclination of the position of the center of mass of the moving body 100 with respect to the vertical axis extending upwardly from the axles 30 and 32. For example, the inclination angle of the body 12 is defined to be "positive" when the body 12 is inclined forward in the traveling direction of the moving body 100, and defined to be "negative" when the body 12 is inclined backward in the traveling direction of the moving body 100.

Further, in addition to the inclination angle in the traveling direction, an inclination angle velocity in the lateral direction is also measured by using the three-axis (roll, pitch, and yaw) gyro-sensor 48. In this manner, the gyro-sensor 48 measures variations in the inclination angles of the body 12 as the inclination angle velocities of the body 12. As a matter of course, the gyro-sensor 48 may be mounted in other portions. The inclination angle velocities measured by the gyro-sensor 48 vary in accordance with variations in the posture of the moving body 100. That is, the inclination angle velocities are variations that vary in accordance with a shift amount of the position of the center of mass of the body 12 with respect to the positions of the axles. Accordingly, when the inclination angles of the body 12 vary abruptly by a disturbance or the like, inclination angle velocity values become larger.

The column 72 is provided near the center of the pedestal 70. The column 72 supports the passenger seat 22. That is, the passenger seat 22 is fixed to the pedestal 70 through the column 72. The passenger seat 22 has a chair-like shape on which the passenger can be seated. A manipulation module 46 is provided on the side surface of the passenger seat 22. A manipulation lever (not shown) and a brake lever (not shown) are provided on the manipulation module 46. The manipulation lever is a manipulation member that is used by the passenger to adjust the traveling velocity and the traveling direction of the moving body 100. The passenger can adjust the traveling velocity of the moving body 100 by adjusting the manipulation amount of the manipulation lever. Further, the passenger can specify the traveling direction of the moving body 100 by adjusting the manipulation direction of the manipulation lever. The moving body 100 can perform forward movements, stops, backward movements, left turns, right turns, left rotations, and right rotations in accordance with manipulations applied to the manipulation lever. The passenger can put a brake on the moving body 100 by tilting the brake lever. The moving body 100 travels in the direction perpendicular to the axles 30 and 32.

Furthermore, the control portion 80 is mounted on the backrest portion of the passenger seat 22. The control portion 80 controls the traveling (movement) of the moving body 100 by controlling the right wheel drive motor 34 and the left wheel drive motor 36 in accordance with the manipulations carried out on the manipulation module 46 by the passenger. The seating surface of the passenger seat 22 is disposed in parallel to the upper surface of the pedestal 70. The control portion 80 controls the right wheel drive motor 34 and the left wheel drive motor 36 in accordance with the manipulations carried out on the manipulation module 46. In this manner, the right wheel drive motor 34 and the left wheel drive motor 36 are driven at a torque command value in accordance with the manipulations on the manipulation module 46.

The control portion 80 includes a CPU (Central Processing Unit), a ROM (Read Only Memory), a RAM (Random Access Memory), and a communication interface, and controls various operations of the moving body 100. Further, the control portion 80 carries out various control in accordance with a control program stored, for example, in the ROM. The control portion 80 controls the right wheel drive motor 34 and the left wheel drive motor 36 independently from each other by using well-known feedback control at the predetermined angle.

Figure 3:
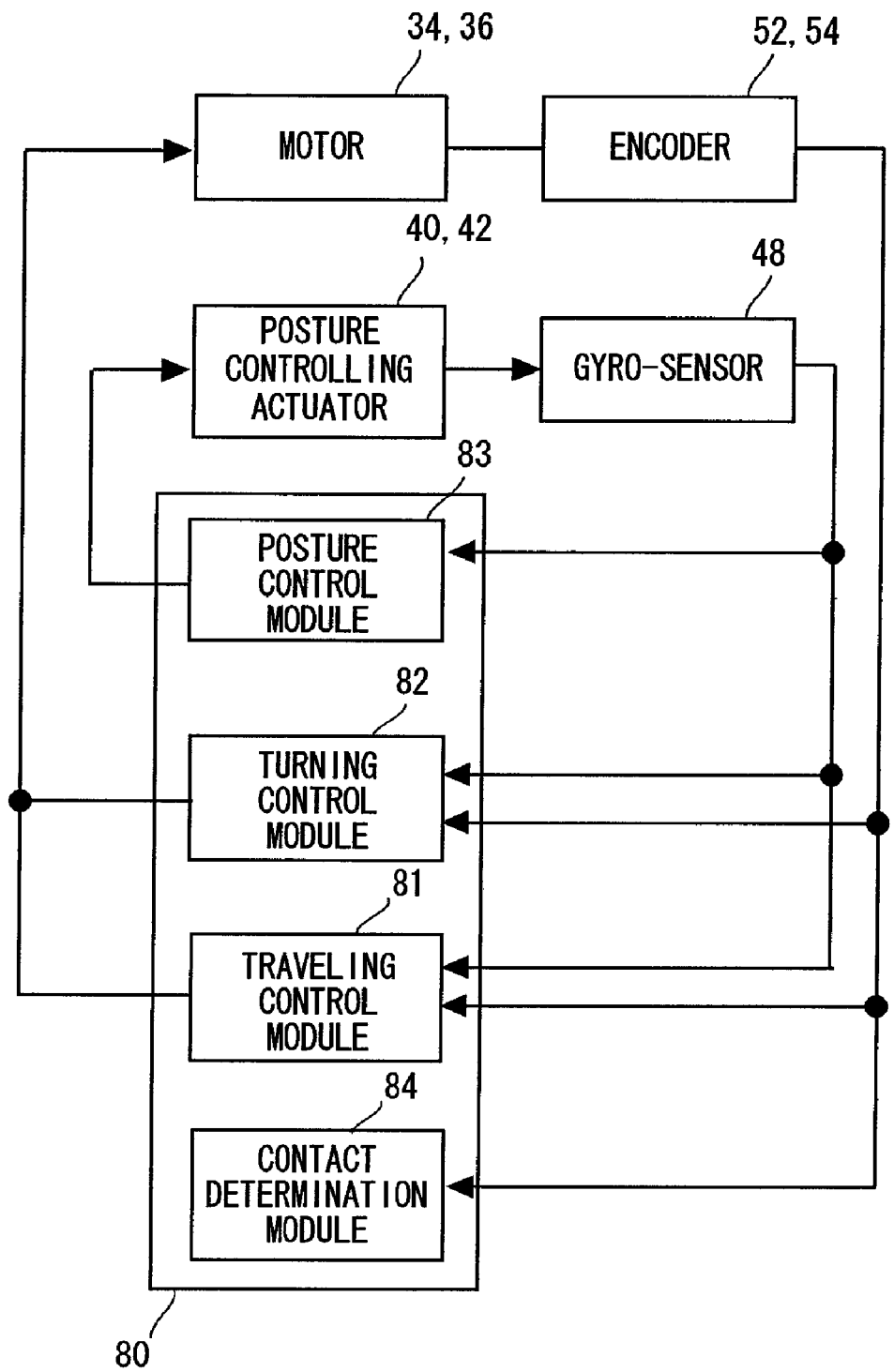
FIG. 3 is a block diagram showing the structure of a control system of the moving body according to a first embodiment of the present invention.

Referring next to FIG. 3, the control performed by the control portion 80 will be described. FIG. 3 is a block diagram for explaining the control performed by the control portion 80. The control portion 80 includes a travel control module 81, a turning control module 82, a posture control module 83 serving as a posture control portion, and a contact determination module 84 serving as a contact determination portion. The control portion 80 controls the travel control module 81, the turning control module 82, the posture control module 83, and the contact determination module 84 in an integrated manner.

The travel control module 81 includes an amplifier that controls the right wheel drive motor 34 and the left wheel drive motor 36. The travel control module 81 outputs a drive signal to the right wheel drive motor 34 and the left wheel drive motor 36, and performs feedback control of the right driving wheel 18 and the left driving wheel 20. Specifically, measured values obtained by the right wheel encoder 52 and the left wheel encoder 54 are input to the travel control module 81.

Further, the inclination angle velocity obtained by the gyro-sensor 48 is input to the travel control module 81 so that the inverted state becomes stable. Furthermore, the command value corresponding to the manipulations carried out on the manipulation module 46 is input to the travel control module 81. Then, the travel control module 81 drives the right wheel drive motor 34 and the left wheel drive motor 36 based on the measured values, the inclination angle velocity, and the command value. In this manner, the travel control module 81 performs feedback control of the right driving wheel 18 and the left driving wheel 20. As a result, the moving body 100 moves in accordance with the manipulations carried out on the manipulation module 46. As a result, the moving body 100 travels stably in the inverted state. In this case, a well-known control method can be employed as the feedback control method.

The turning control module 82 includes a turning motion control portion (not shown) that controls the turning motion of the moving body 100 after the moving body 100 comes into contact with an obstacle. Specifically, the turning control module 82 includes an amplifier that controls the right wheel drive motor 34 and the left wheel drive motor 36. Further, the turning control module 82 outputs a drive signal to each of the right wheel drive motor 34 and the left wheel drive motor 36, and performs feedback control of the right driving wheel 18 and the left driving wheel 20. More specifically, the measured values obtained by the right wheel encoder 52 and the left wheel encoder 54 are input to the turning control module 82. Then, the turning control module 82 drives each of the right wheel drive motor 34 and the left wheel drive motor 36 based on the measured values, thereby allowing the moving body 100 to carry out the turning motion. In this case, the turning control module 82 drives the right wheel drive motor 34 and the left wheel drive motor 36 so that the moving body 100 turns about the vertical axis.

Thus, a forward and backward rocking motion caused by the reaction generated due to the contact is avoided by the turning motion, which results in a reduction in unstable operations occurring when the moving body comes into contact with an obstacle. Accordingly, even when the moving body collides with an obstacle, the moving body can safely avoid the obstacle without causing the passenger to swing significantly. Further, when the moving body 100 is turned to the position/posture to be substantially in parallel to the obstacle, the obstacle is not present at a forward position in the traveling direction of the moving body 100. Accordingly, after colliding with the obstacle, the moving body 100 can easily perform the control for maintaining the inverted state in the front-back direction about the axis parallel to the ground. Further, since the obstacle is not present in front of the moving body, the moving body 100 can start moving immediately after the inverted state of the moving body 100 becomes stable.

Further, the turning control module 82 includes a turning motion calculation portion (not shown) that calculates a forward and backward rocking motion generated due to a contact between the moving body 100 and the obstacle, as a corresponding turning motion in a direction in which the inverted pendulum type moving body turns. The turning control module 82 controls the right wheel drive motor 34 and the left wheel drive motor 36 in a direction in which the forward and backward rocking motion caused due to the contact is cancelled out, thereby allowing the moving body 100 to perform a turning motion about the vertical axis. The turning control module 82 allows the moving body 100 to perform the turning motion based on the command values such as the turning speed and the turning radius that are given by the turning motion calculation portion.

In this case, the turning motion calculation portion calculates the turning motion based on an output of a sensor that measures variations that vary in accordance with a distance in the traveling direction between the position of each of the axles 30 and 32 and the position of the center of mass of the body 12. Thus, it is possible to calculate the turning motion with higher accuracy. The sensor detects the inclination angle velocity of the body 12 as a variation. The gyro-sensor 48, for example, can be adopted as the sensor that detects the inclination angle velocity. When the detection signal from the gyro-sensor 48 that detects the inclination angle velocity is used, the response can be improved. Note that the inclination angle velocity may be measured by a sensor other than the gyro-sensor 48. For example, the posture controlling actuators 40 and 42 may be provided with an encoder that detects the rotation angle. Alternatively, the body 12 may be provided with a posture angle sensor that detects the posture angle and with an encoder that detects the rotation angle, to thereby obtain the inclination angle velocity by temporal differentiation of the detected angle.

Further, the variations that vary in accordance with the distance in the traveling direction between the position of each of the axles 30 and 32 and the position of the center of mass of the body 12 may be other than the inclination angle velocity. That is, the variations that vary in accordance with the distance in the traveling direction between the position of each of the axles 30 and 32 and the position of the center of mass of the body 12 are not limited to the inclination angle velocity of the body 12. For example, the turning motion may be calculated based on the rotation amount of the right wheel drive motor 34 and the left wheel drive motor 36 or based on accelerations of the body which are measured by an acceleration sensor, as the variations. Specifically, the turning motion can be calculated based on the velocity of the moving body 100 which is obtained immediately before the moving body 100 comes into contact with the obstacle, and based on the time required for stopping rotation of the wheel due to the contact.

The posture control module 83 controls the posture of the moving body 100. That is, the posture control module 83 includes an amplifier that drives the right posture controlling actuator 40 and the left posture controlling actuator 42. The posture control module 83 outputs a control signal to drive the right posture controlling actuator 40 and the left posture controlling actuator 42. Thus, the posture control module 83 allows the body 12 to rotate in the front-back direction and to be inclined in the lateral direction. In short, the posture control module 83 is capable of controlling the posture of the moving body 100. In this case, the posture control module 83 drives the right posture controlling actuator 40 and the left posture controlling actuator 42 to incline the body 12 so that the turning center side becomes lower than the ground surface on which the wheels are located. As a result, the centrifugal force generated when the moving body 100 turns is cancelled, thereby enabling the moving body to turn stably. Furthermore, the turning radius can be made smaller, thereby enabling the moving body to turn swiftly.

The contact determination module 84 determines whether the moving body 100 comes in contact with an obstacle. For example, the contact determination module 84 is capable of determining whether the moving body 100 comes into contact with an obstacle, based on an output of an encoder that measures the current position of the moving body 100 from the rotation amount of the right driving wheel 18 and the left driving wheel 20. Specifically, the encoder measures the number of rotations of the wheels as the rotation amount of the wheels, thereby making it possible to measure the current position of the moving body 100. Accordingly, when a difference between the current position of the moving body 100, which is output by the encoder, and the target position thereof is equal to or larger than a predetermined threshold value, the contact determination module 84 can determine that the moving body 100 is in contact with the obstacle. As a result, a timing at which the moving body comes into contact with the obstacle can be specified and avoidance control can be performed according to the contact timing. Thus, the moving body can avoid the obstacle more safely. Furthermore, the contact between the moving body and the obstacle can be determined with higher accuracy based on the current position of the moving body 100.

When the rotation torque of the wheels is used, for example, in the case of determination, in addition to means that determines the contact based on the output of the encoder, the determination of the contact can be made with higher accuracy. Specifically, the moving body 100 determines the rotation torque necessary for reaching the target position. Further, during the movement, a pressure sensor provided to each axis, for example, can detect the magnitude of the rotation torque of the wheels as the rotation amount of the wheels in chronological order. Thus, when the target rotation torque of the wheels, which is determined for the movement, and the detected actual difference in rotation torque are equal to or larger than the predetermined threshold value, it is possible to determine that the moving body 100 is in contact with the obstacle. As a result, by the combination of the determination using the rotation torque, the contact can be determined with higher accuracy.

Further, the means that determines the contact with the obstacle is not limited to means that determines the contact based on the output of the encoder and the means that determines the contact based on the rotation torque of the wheels. For example, the obstacle detection sensor 58 may be used to determine the contact with the obstacle. Furthermore, the manipulation module 46 may be provided with a switch capable of switching a control mode of the moving body 100, and the passenger himself/herself may press the switch to switch the control mode to a mode for turning control carried out after the contact with the obstacle in the case where the contact with the obstacle is predicted.

Figure 4:
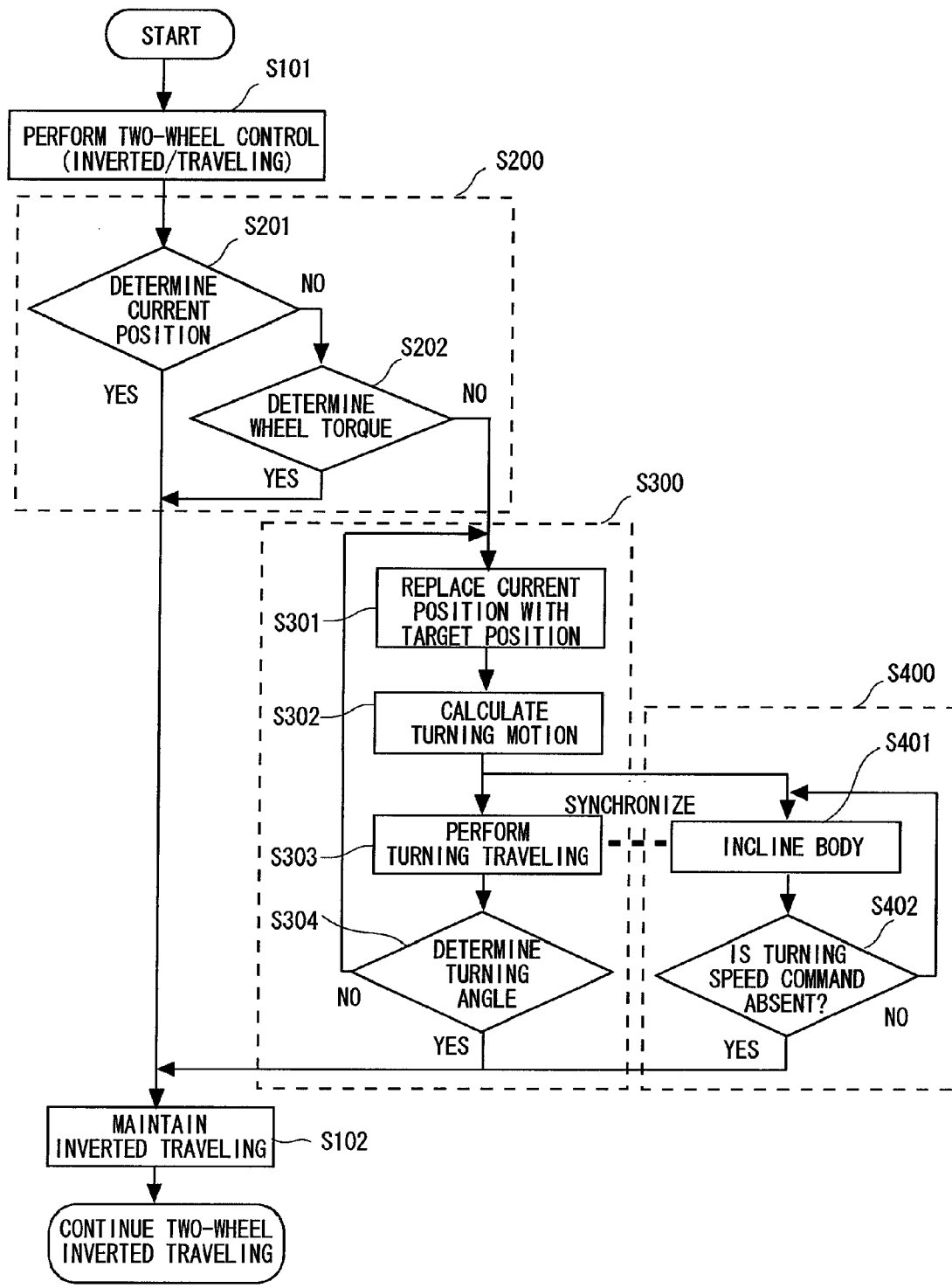
FIG. 4 is a flowchart showing a control method for the moving body according to the first embodiment.
Figure 7:
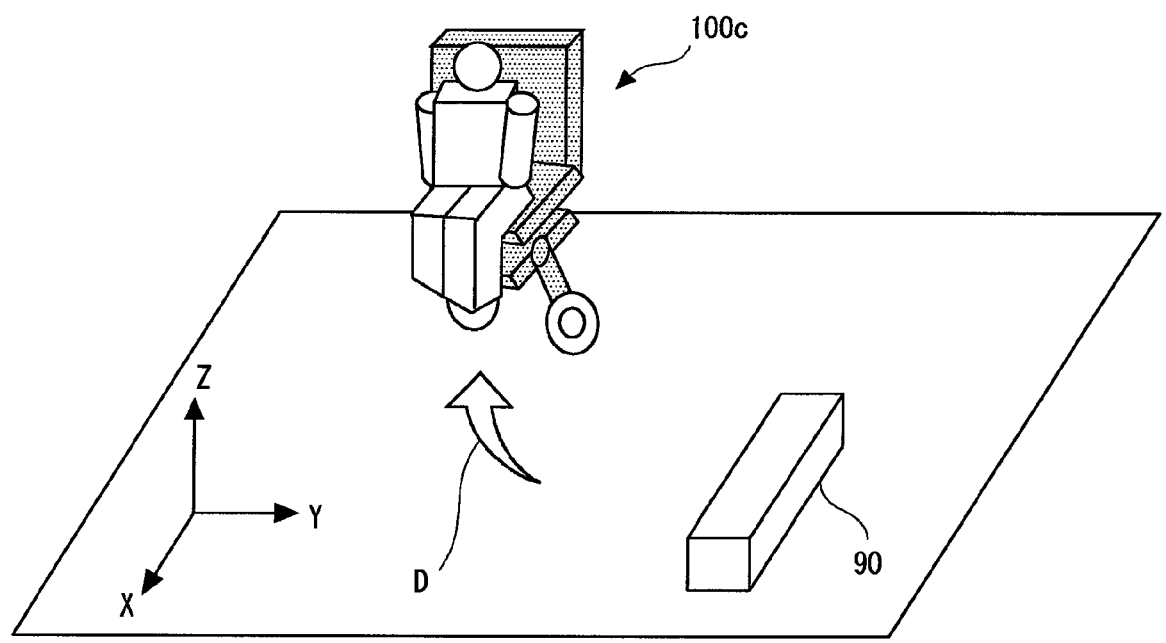
FIG. 7 is a schematic view showing the state where the moving body according to the first embodiment performs the avoidance behavior after coming into contact with the obstacle.
Figure 8:
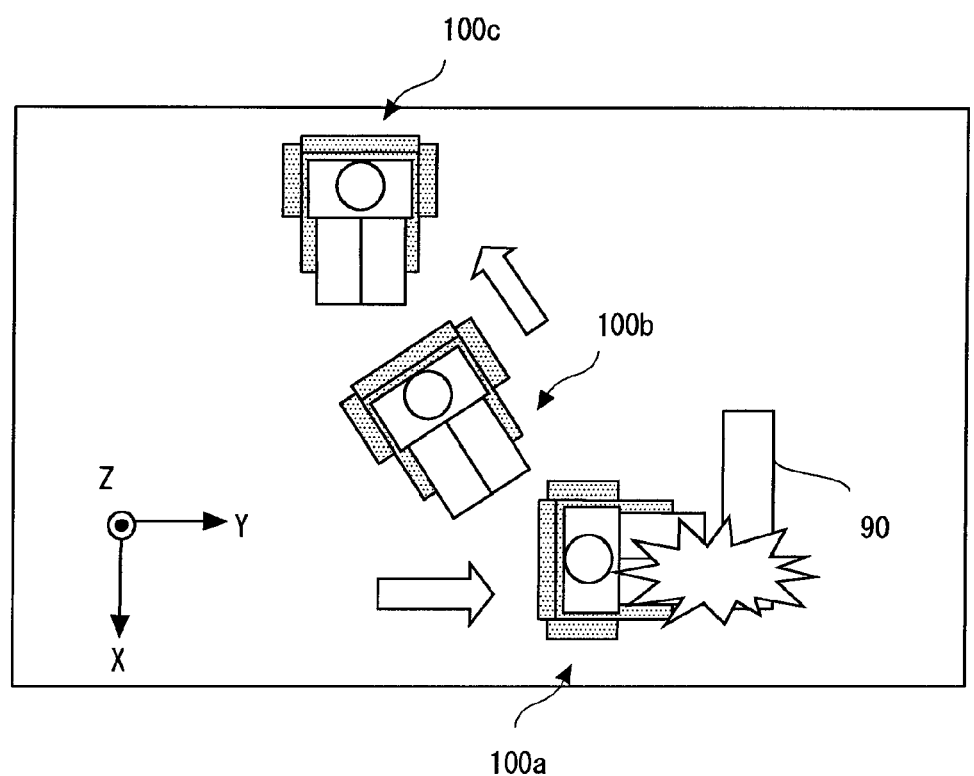
FIG. 8 is a schematic top view showing the state where the moving body according to the first embodiment performs the avoidance behavior after coming into contact with an obstacle.
Figure 9:
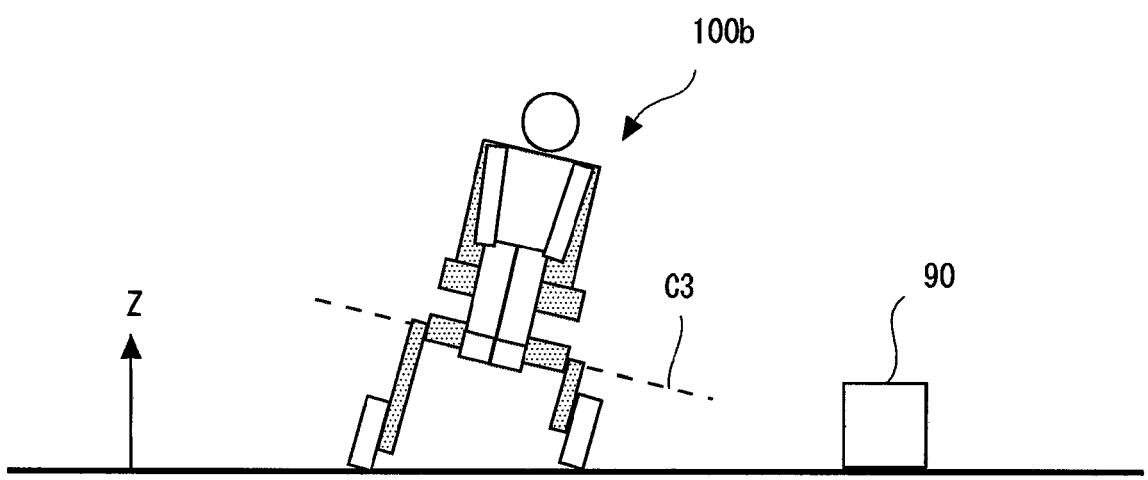
FIG. 9 is a schematic view showing the state where the moving body according to the first embodiment performs the avoidance behavior after coming into contact with the obstacle.

Referring next to FIGS. 4 and 9, a description is given of the turning motion control and the posture control carried out after the moving body 100 comes into contact with the obstacle. FIG. 4 is a flowchart showing the above-mentioned control method. Portions surrounded by the broken lines of FIG. 4 show the contents of the control executed by the contact determination module 84, the turning control module 82, and the posture control module 83, respectively, in the stated order from the left side of FIG. 4. FIGS. 5 to 9 are schematic views for explaining the state where the moving body 100 performs an avoidance behavior after coming into contact with the obstacle. In this case, a description is given of the case where the moving body 100 comes into contact with an obstacle 90 when the moving body 100 travels. Note that the components shown in FIGS. 1 and 2 are omitted in FIGS. 5 to 9 as appropriate for ease of explanation.

Figure 5:
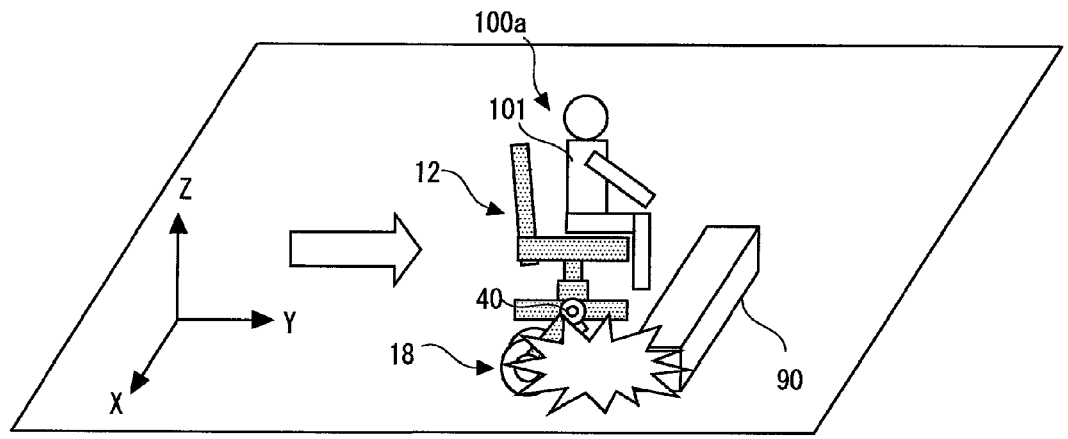
FIG. 5 is a schematic view showing the state where the moving body according to the first embodiment performs an avoidance behavior after coming into contact with an obstacle.
Figure 6:
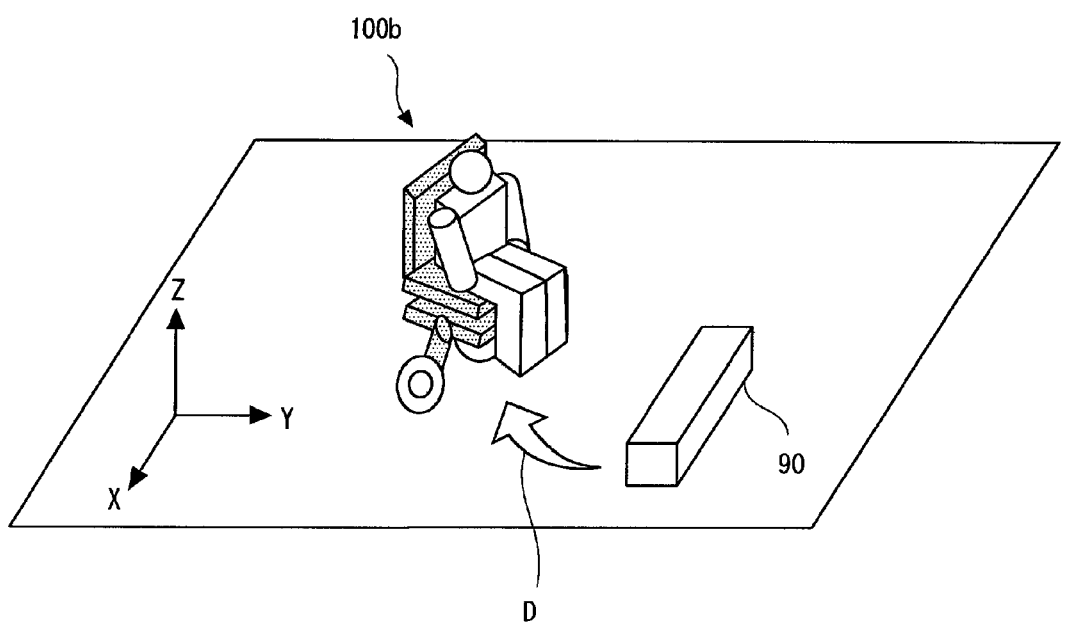
FIG. 6 is a schematic view showing the state where the moving body according to the first embodiment performs the avoidance behavior after coming into contact with the obstacle.

FIG. 5 illustrates the moving body 100 moving from the left side to the right side. Further, the states of the moving body 100 are shown in chronological order by illustrating a moving body 100a, a moving body 100b, and a moving body 100c of FIGS. 5 to 7, respectively. After coming into contact with the obstacle 90, the moving body 100a shifts to the state of the moving body 100b at the next timing. Likewise, after coming into contact with the obstacle and turning, the moving body 100b shifts to the state of the moving body 100c at the next timing. In this manner, the state of the moving body shifts in the order of the moving body 100a, the moving body 100b, and the moving body 100c. Note that FIG. 8 is a top view of the state where the moving body 100 shown in FIGS. 5 to 7 is traveling. FIG. 9 is a side view showing the state where the body 12 is inclined by the posture control during the turning control. FIG. 9 is a side view showing the state where body 12 is inclined by the posture control during the execution of the turning control. That is, FIG. 9 is a side view showing the state where the posture control is carried out when the moving body 100 turns after coming into contact with the obstacle 90.

The travel control module 81 performs two-wheel control so as to allow the moving body to travel normally (Step S101). In this case, the right wheel drive motor 34 and the left wheel drive motor 36 are driven to allow the moving body to travel stably in the inverted state.

The contact determination module 84 determines the current position of the moving body 100 based on the output of the encoder (Step S201). Specifically, when the difference between the current position of the moving body 100, which is output from the encoder, and the target position thereof is equal to or larger than the predetermined threshold value, the contact determination module 84 determines that there is a possibility that the moving body 100 is in contact with the obstacle 90. When the moving body 100 travels normally, that is, when the moving body 100 is not in contact with the obstacle 90, the difference between the current position and the target position falls within about a range of differences predicted during the normal traveling. That is, the difference does not exceed the predetermined threshold value set in the range of differences predicted during the normal traveling.

Accordingly, as long as the difference between the current position and the target position of the moving body 100 does not exceed the predetermined threshold value, the travel control module 81 maintains the inverted traveling (Step S102). Specifically, the travel control module 81 drives the right wheel drive motor 34 and the left wheel drive motor 36 based on the command values in accordance with the manipulations carried out on the manipulation module 46. Further, according to the inclination angle velocity obtained from the gyro-sensor 48, the right wheel drive motor 34 and the left wheel drive motor 36 are controlled so that the moving body is inverted. As a result, the right driving wheel 18 and the left driving wheel 20 rotate at a desired rotational velocity. Unless the moving body comes into contact with the obstacle 90, the above-mentioned process is repeated and the two-wheel inverted traveling is continued.

On the other hand, during the normal travelling, the wheels of the moving body 100 come into contact with the obstacle 90 (see moving body 100a shown in FIG. 5). When the moving body 100 comes into contact with the obstacle 90, the right driving wheel 18 and the left driving wheel 20 stop rotating without moving forward, and a reaction (impact reaction) is generated in a direction opposite to the traveling direction. The current position is spaced far apart from the target position due to the forward and backward rocking motion generated by the impact reaction. In this case, when the contact determination module 84 determines the current position based on the output result of the encoder (Step S201), the difference between the current position and the target position exceeds the predetermined threshold value. Further, the contact determination module 84 determines whether a difference between an actual rotation torque and a target rotation torque of the wheels exceeds the predetermined threshold value (Step S202). When determining that the difference in rotation torque does not exceed the predetermined threshold value, the contact determination module 84 determines that a sufficient amount of movement is not obtained through the rotations of the wheels, not because of the contact with the obstacle 90 but because of other causes such as wheel slippage. As a result, the travel control module 81 maintains the inverted traveling (Step S102).

When it is determined that the difference in rotation torque exceeds the predetermined threshold value in Step S202, the turning control module 82 replaces the current position with the target position, and instructs the travel control module 81 to stop application of a driving force by the wheel drive motors (Step S301). As a result, after the moving body comes into contact with the obstacle, the control for the forward movement can be swiftly released based on the position command. This prevents the moving body from repeatedly coming into contact with the obstacle after the contact. Accordingly, the moving body can avoid the obstacle more safely. Then, the turning control module 82 calculates a forward and backward rocking motion caused by the reaction generated due to the contact between the moving body 100 and the obstacle 90, as a corresponding turning motion in the direction in which the moving body 100 turns (Step S302). For example, the inclination angle velocity of the body 12 is measured using the gyro-sensor 48, and the turning motion is calculated based on an output of the sensor.

Then, the turning control module 82 allows the moving body 100 to perform turning traveling about the vertical axis in the direction in which the forward and backward rocking motion generated due to the contact is cancelled out (Step S303). The turning control module 82 gives command values such as the turning speed and the turning radius as the turning motion, thereby allowing the moving body 100 to perform turning traveling (see moving body 100b shown in FIG. 6 and moving body 100c shown in FIG. 7). In this case, the moving body 100 is allowed to perform turning traveling in a direction indicated by the outline arrow D about the vertical axis (z-axis). In this manner, the right wheel drive motor 34 and the left wheel drive motor 36 are driven to allow the moving body to perform the turning traveling, thereby avoiding the forward and backward rocking motion, which is caused by the reaction generated due to the contact, by the turning motion.

Next, the turning control module 82 determines whether the turning angle at which the moving body 100 turns reaches the target value (Step S304). For example, it is assumed that the target value of the turning angle is set to 90 degrees about the center of the turning axis. When the moving body is allowed to turn by 90 degrees about the turning axis, the moving body 100 can be moved to the position/posture to be substantially in parallel to the obstacle 90. When the turning angle does not reach the target value, the turning control module 82 replaces the current position with the target position, and instructs the travel control module 81 to stop application of the driving force by the wheel drive motors (Step S301). Then, the moving body 100 is continuously allowed to perform the turning traveling about the vertical axis based on the calculated turning motion (Step S303).

Meanwhile, when determining that the turning angle reaches the target value in Step S304, the travel control module 81 resumes the inverted traveling (Step S102). When the passenger himself/herself manipulates the moving body, the inverted traveling is performed by the manipulations carried out on the manipulation module 46. When autonomic traveling is performed, a position command value necessary for traveling from the current position to a new destination is obtained, and the position command value is given to the travel control module 81, thereby continuing the inverted traveling.

The posture control module 83 performs the posture control in synchronization with the turning control of Step S303. The posture control module 83 drives the right posture controlling actuator 40 and the left posture controlling actuator 42 to incline the body 12 so that the center side of the turning axis becomes lower than the ground surface on which the wheels are located (Step S401). In other words, during the turning traveling in Step S303, the turning traveling is performed while the body 12 is inclined so that the center side of the turning axis becomes lower than the ground surface. In this case, the moving body is inclined so that the rotation axis C3 of the body 12 becomes lower than the center side of the turning axis, with the side on which the obstacle 90 is present being as the center side of the turning axis (see FIG. 9). Note that the inclination angle at which the body 12 is inclined may be calculated based on the turning speed and the turning radius obtained during the turning traveling, or may be calculated based on the inclination angle velocity measured by the gyro-sensor 48, for example. In this case, as the centrifugal force generated due to the turn increases, the inclination angle obtained during the turning traveling increases. Thus, the right posture controlling actuator 40 and the left posture controlling actuator 42 are driven to incline the moving body, thereby making it possible to reduce the centrifugal force generated when the moving body turns.

Then, the posture control module 83 determines whether a turning speed command for the turning control of Step S303 is given (Step S402). When the turning speed command is given, the posture control module 83 continuously inclines the body 12. On the other hand, when the turning speed command is not given in Step S402, the body 12 is restored from the inclined state to the original horizontal state. Then, the travel control module 81 resumes the inverted traveling (Step S102).

In the above description, the right posture controlling actuator 40 and the left posture controlling actuator 42 respectively allow the right rod 14 and the left rod 16 to rotate with respect to the body 12, but the present invention is not limited thereto. For example, the right posture controlling actuator 40 and the left posture controlling actuator 42 may be provided with a prismatic joint, and one of the right driving wheel 18 side and the left driving wheel 20 side of the body 12 may be slid in the vertical direction. Specifically, when the moving body turns about the vertical axis, for example, the left posture controlling actuator 42 is driven to slide the left driving wheel 20 side of the body 12 downward of the vertical axis, and the right posture controlling actuator 40 is driven to slide the right driving wheel 18 side of the body 12 upward of the vertical axis. In short, the moving body is inclined in the vertical axis direction so that the right driving wheel 18 side of the body 12 becomes lower than the left driving wheel 20 side of the body 12. As a matter of course, the present invention is not limited to the structure in which both the right rod 14 and the left rod 16 are driven by the right posture controlling actuator 40 and the left posture controlling actuator 42, respectively. Alternatively, only at least one of the right rod 14 and the left rod 16 may be driven. In short, the posture may be controlled by independently driving at least one of the right rod 14 and the left rod 16.

Note that, as a method of determining whether the difference between the determined target rotation torque of the wheels and the detected actual rotation torque exceeds the predetermined threshold value in Step S202, the following method can be employed, for example. That is, a plurality of (for example, three) values of the actual rotation torque of the wheels, which are sequentially obtained in chronological order, are continuously obtained, and a mean value of those values is compared with a preset value of the target rotation torque. As a result, a value of a large actual rotation torque generated abruptly is averaged, thereby making it possible to detect an increase in actual rotation torque due to the obstacle with high accuracy.

Note that, as for the threshold value for determining the contact with the obstacle 90 as described above, it is preferable to conduct an experiment in advance so as to determine an appropriate value used for performing appropriate determination. In this experiment, experimental data is obtained statistically by changing various parameters such as the velocity and material of a floor surface of the moving body 100, and the appropriate value is determined based on the data.

Second Embodiment

Next, an inverted pendulum type moving body according to a second embodiment of the present invention will be described with reference to the block diagram of FIG. 10. Note that the inverted pendulum type moving body according to the second embodiment has the same structure as that shown in FIGS. 1 and 2, so a description thereof is omitted. In the second embodiment, components identical with or similar to those of the moving body 100 described in the above embodiment are denoted by the same reference symbols, and a description thereof is omitted.

Figure 10:
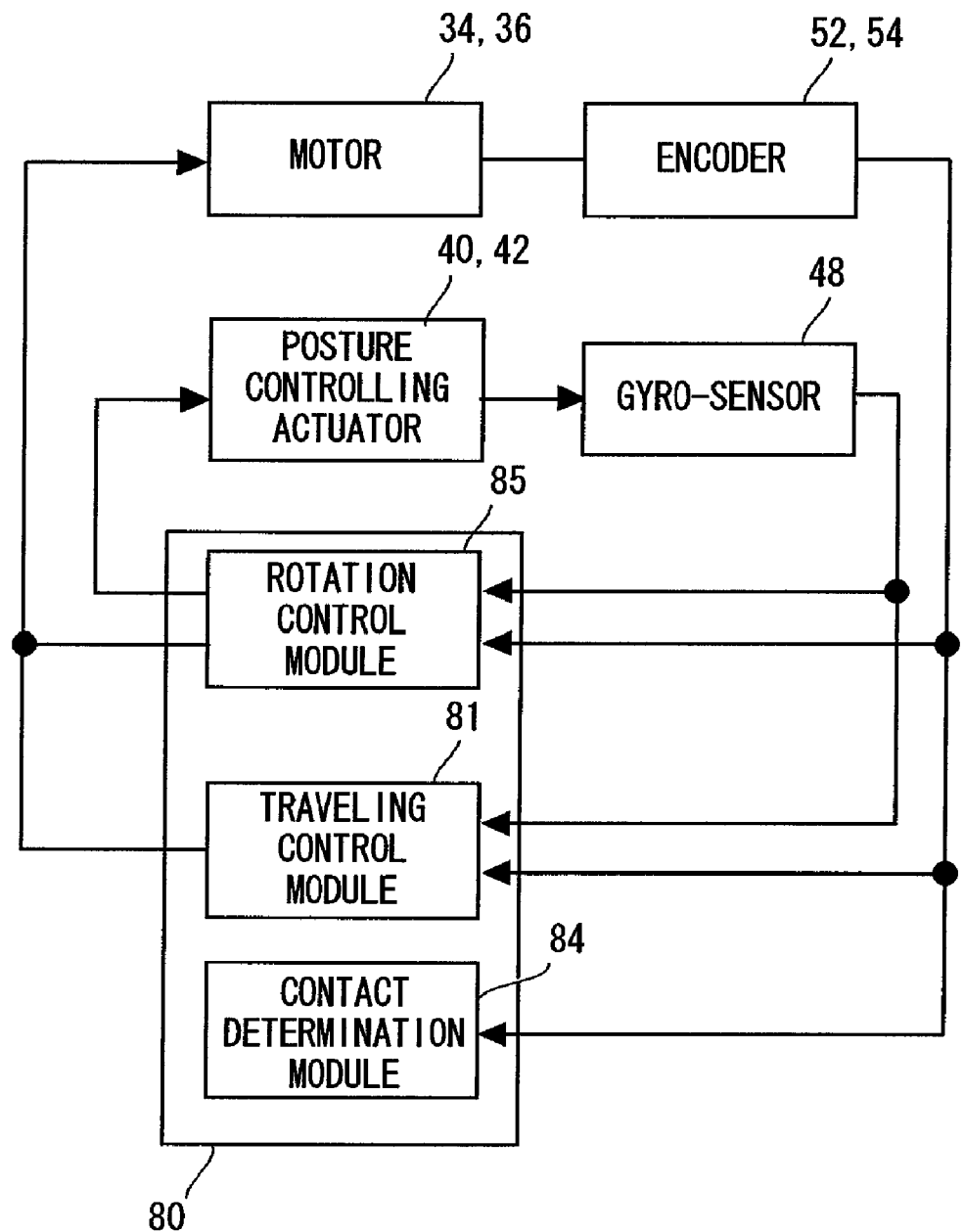
FIG. 10 is a block diagram showing the structure of a control system for a moving body according to a second embodiment of the present invention.

FIG. 10 is a block diagram for explaining the control performed by the control portion 80. The control portion 80 includes the travel control module 81, a rotation control module 85, and the contact determination module 84 serving as a contact determination portion. The control portion 80 controls the travel control module 81, the rotation control module 85, and the contact determination module 84 in an integrated manner. Note that the travel control module 81 and the contact determination module 84 have the same structure as that of the first embodiment, so a description thereof is omitted.

The rotation control module 85 includes a rotational motion control portion (not shown) that controls the rotational motion of the upper body portion of the moving body 100 about an axis parallel to the axles 30 and 32. In other words, the rotation control module 85 includes an amplifier that drives the right posture controlling actuator 40 and the left posture controlling actuator 42. The rotation control module 85 outputs a control signal to drive the right posture controlling actuator 40 and the left posture controlling actuator 42. As a result, the upper body portion of the body 12 can be rotated in the front-back direction about the axis parallel to the axles 30 and 32.

Thus, the upper body portion of the moving body 100 is allow to perform the rotational motion in the direction in which a forward and backward rocking motion generated due to the contact is cancelled out, thereby making it possible to reduce the unstable operations occurring when the moving body comes into contact with the obstacle. As a result, even when the moving body collides with the obstacle, the moving body can avoid the obstacle without causing the passenger to swing significantly.

Further, the rotation control module 85 includes a rotational motion calculation portion (not shown) that calculates the forward and backward rocking motion of the moving body 100, which is generated due to a contact between the moving body 100 and the obstacle, as a corresponding rotational motion of the upper body portion about the axis parallel to the axles 30 and 32 of the moving body 100. The rotation control module 85 controls the actuators 40 and 42 to perform the upper body portion of the moving body 100 to perform the rotational motion in the front-back direction so that the forward and backward rocking motion is cancelled out by the rotational motion. The rotation control module 85 allows the upper body portion of the moving body 100 to perform the rotational motion according to the command values such as the rotational velocity given by the rotational motion calculation portion.

In this case, the rotational motion calculation portion calculates a forward and backward rocking rotation angle based on an output of a sensor that measures variations that vary in accordance with a distance in the traveling direction between the position of each of the axles 30 and 32 and the position of the center of mass of the body 12. As a result, the rotational motion can be calculated with higher accuracy. For example, the gyro-sensor 48 can be employed as the sensor that detects the inclination angle velocity of the body 12 as the variations. The use of a detection signal from the gyro-sensor 48 enables improvement of the response. Note that the inclination angle velocity may be measured by a sensor other than the gyro-sensor 48. For example, the posture controlling actuators 40 and 42 may be provided with an encoder that detects the rotation angle. Alternatively, the body 12 may be provided with a posture angle sensor that detects the posture angle and with an encoder that detects the rotation angle, to thereby obtain the inclination angle velocity by temporal differentiation of the detected angle.

Further, the variations that vary in accordance with the distance in the traveling direction between the position of each of the axles 30 and 32 and the position of the center of mass of the body 12 may be other than the inclination angle velocity. In other words, the variations that vary in accordance with the distance in the traveling direction between the position of each of the axles 30 and 32 and the position of the center of mass of the body 12 is not limited to the inclination angle velocity of the body 12. For example, torque may be calculated based on the rotation amount of the right wheel drive motor 34 and the left wheel drive motor 36, or based on accelerations of the body which are measured by an acceleration sensor, as the variations. Specifically, a rotational rocking motion can be detected based on the velocity of the moving body 100, which is obtained immediately before the contact with the obstacle, and based on the time required for stopping rotation of the wheels due to the contact.

Figure 11:
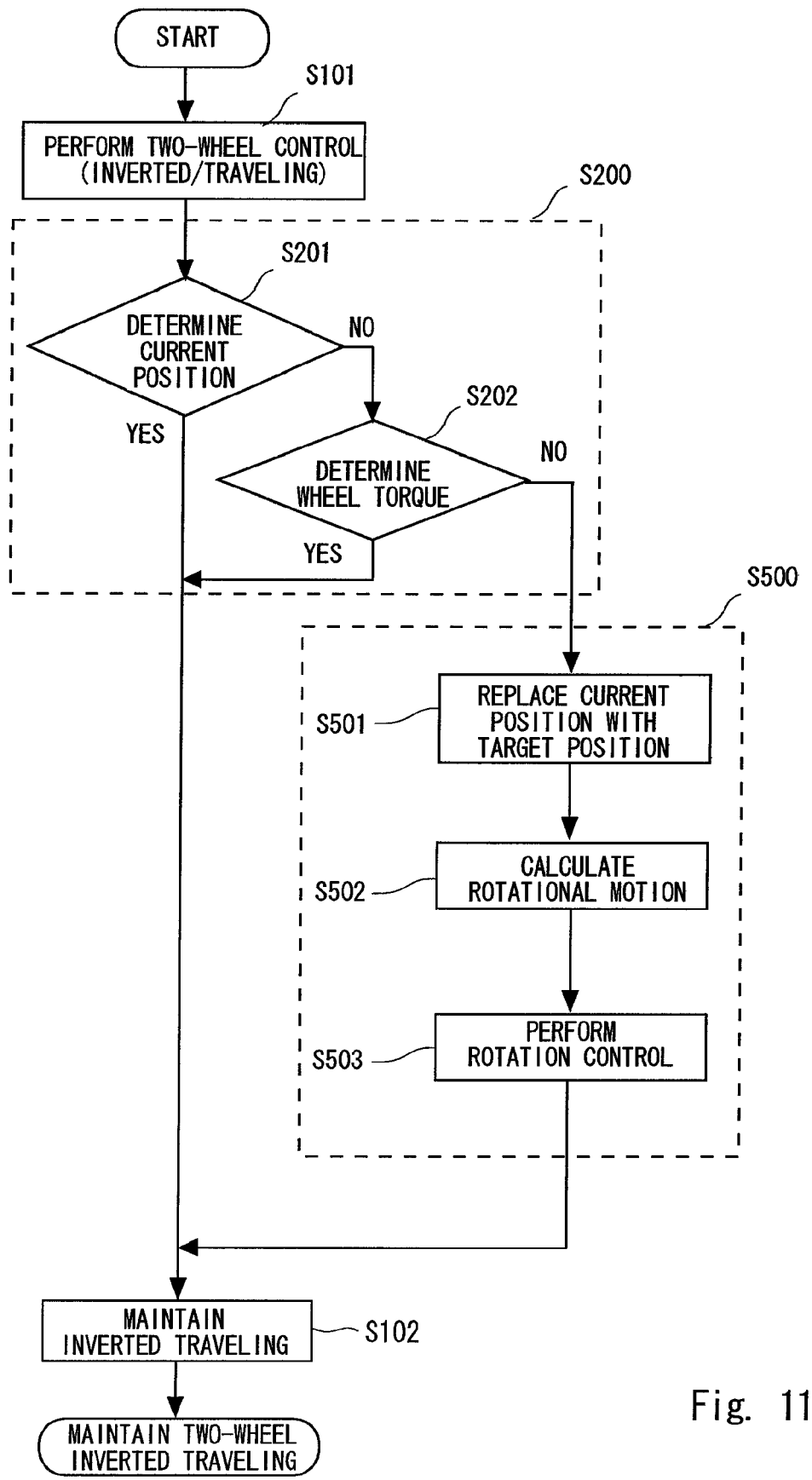
FIG. 11 is a flowchart showing a control method for the moving body according to the second embodiment.
Figure 12A:
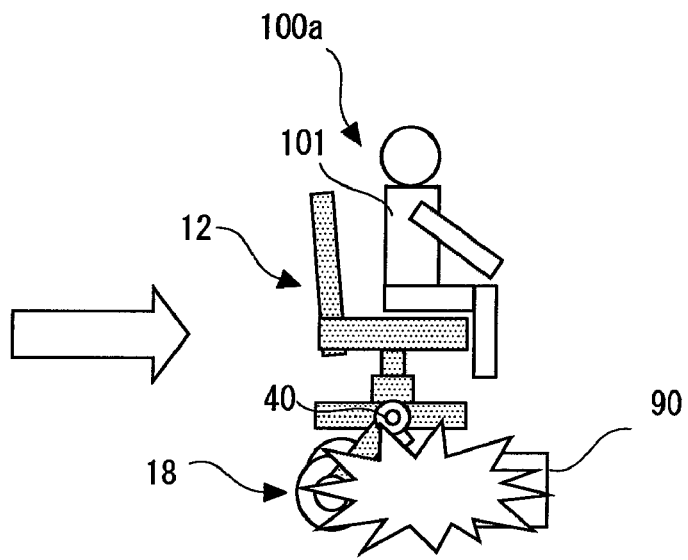
FIG. 12A is a schematic view showing the state where the moving body according to the second embodiment performs an avoidance behavior after coming into contact with an obstacle.
Figure 12B:
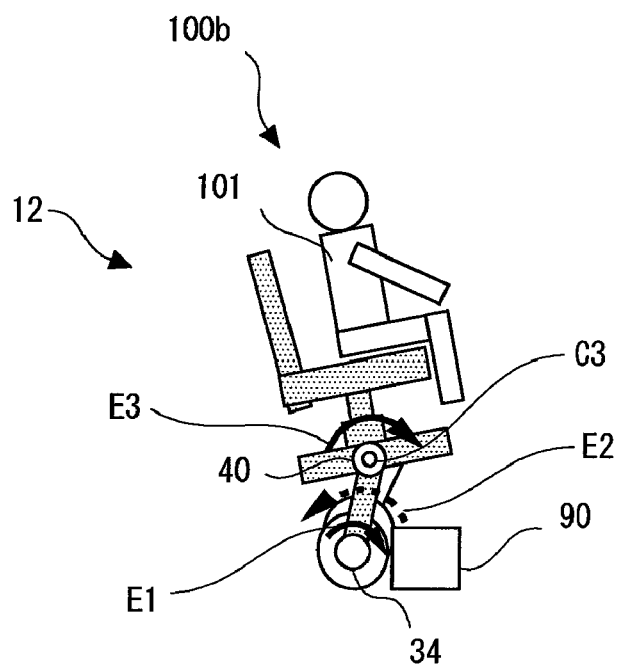
FIG. 12B is a schematic view showing the state where the moving body according to the second embodiment performs the avoidance behavior after coming into contact with the obstacle.

Referring next to FIGS. 11, 12A, and 12B, a description is given of the rotation control carried out after the moving body 100 comes into contact with the obstacle. FIG. 11 is a flowchart showing the above-mentioned control. FIGS. 12A and 12B are schematic views for explaining the state where the moving body 100 performs the avoidance behavior after coming into contact with the obstacle. In this case, a description is given of the case where the right driving wheel 18 and the left driving wheel 20 of the moving body 100 come into contact with the obstacle 90 when the moving body 100 travels. Note that the components shown in FIGS. 1 and 2 are omitted as appropriate in FIGS. 12A and 12B for ease of explanation.

FIG. 12A illustrates the moving body 100a moving from the left side to the right side. Further, in chronological order, after coming into contact with the obstacle 90, the moving body 100a shifts to the moving body 100b as shown in FIG. 12B at the next timing.

When the moving body 100 travels normally, the wheels of the moving body 100 come into contact with the obstacle 90 (see moving body 100a shown in FIG. 12A). When the moving body 100 comes into contact with the obstacle 90, the right driving wheel 18 and the left driving wheel 20 stop rotating without moving forward, and a reaction (impact reaction) is generated in the direction opposite to the traveling direction. The current position is spaced far apart from the target position due to the forward and backward rocking motion generated by the impact reaction. In this case, when the contact determination module 84 determines the current position based on the output result of the encoder (Step S201), the difference between the current position and the target position exceeds the predetermined threshold value. Further, the contact determination module 84 determines whether a difference between an actual rotation torque and a target rotation torque of the wheels exceeds the predetermined threshold value (Step S202). When determining that the difference in rotation torque does not exceed the predetermined threshold value, the contact determination module 84 determines that a sufficient amount of movement is not obtained through the rotations of the wheels, not because of the contact with the obstacle 90 but because of other causes such as wheel slippage. As a result, the travel control module 81 maintains the inverted traveling (Step S102).

When determining that the difference in rotation torque exceeds the predetermined threshold value in Step S202, the rotation control module 85 replaces the current position with the target position, and instructs the travel control module 81 to stop application of the driving force by the wheel drive motors (Step S501). As a result, after the moving body comes into contact with the obstacle, the control for the forward movement can be swiftly released based on the position command. This prevents the moving body from repeatedly coming into contact with the obstacle after the contact. Accordingly, the moving body can avoid the obstacle more safely. Then, the rotation control module 85 calculates a forward and backward rocking motion generated due to the contact with the obstacle 90, as a corresponding rotational motion of the upper body portion about the axis parallel to the axle of the moving body 100 (Step S502). For example, the inclination angle velocity of the body 12 is measured using the gyro-sensor 48, and the rotational motion is calculated based on an output of the sensor.

Next, the rotation control module 85 allows the upper body portion of the moving body 100 to rotate in the front-back direction so that the forward and backward rocking motion is cancelled out (Step S503). The rotation control module 85 gives the command values such as the rotational velocity so as to rotate the upper body portion of the moving body 100. Specifically, the moving body 100 rotates by driving the actuators 40 and 42 so that the forward and backward rocking motion, which is caused by the reaction due to the contact with the obstacle 90 in the direction in which the moving body 100 rotates in the front-back direction, is cancelled out (see moving body 100b shown in FIG. 12B). In this case, the arrow E1 indicates the direction of the driving force of the wheels, which is obtained immediately before the moving body collides with the obstacle 90. The arrow E2 indicates the direction of the drive reaction to the wheels, which is generated by the impact reaction after the collision. The arrow E3 indicates the direction of the rotational motion of the upper body portion of the moving body 100 so that the drive reaction is cancelled out. In short, the actuators 40 and 42 are driven to rotate the moving body, thereby making it possible to reduce the forward and backward rocking motion generated due to the contact. For example, the forward and backward rocking motion can be reduced according to the inclination angle velocity (forward and backward rocking motion) measured by the gyro-sensor 48 when the moving body comes into contact with the obstacle. In this case, as the measured inclination angle velocity (forward and backward rocking motion) increases, the rotational velocity obtained during the rotation increases.

Other Embodiments

In the first embodiment, the case where the turning control is carried out after the moving body 100 comes into contact with the obstacle 90 has been described. In the second embodiment, the case where the moving body 100 performs the rotation control after the moving body 100 comes into contact with the obstacle 90 has been described, but the present invention is not limited thereto. That is, when the moving body 100 comes into contact with the obstacle 90, the turning motion and the rotational motion may be performed so that the forward and backward rocking motion generated due to the contact is cancelled out. Specifically, the turning motion is calculated by the turning motion calculation portion and the rotational motion is calculated by the rotational motion calculation portion. Further, when it is determined that the moving body 100 can avoid the obstacle more safely not by allowing the body 12 to rotate but by allowing the body 12 to turn, the turning control module 82 performs the turning control. Thus, the control is switched based on the forward and backward rocking motion generated due to the contact, thereby making it possible to more effectively reduce the forward and backward rocking motion generated due to the contact with the obstacle 90.

In the above description, when the moving body 100 comes into contact with the obstacle 90, the right posture controlling actuator 40 and the left posture controlling actuator 42 serving as the second actuators are driven to allow the upper body portion of the body 12 to rotate in the front-back direction about the axis parallel to the axles 30 and 32, thereby reducing the unstable operations occurring in the front-back direction, but the present invention is not limited thereto. In other words, the means that serves as the first actuator and drives the upper body portion of the body 12 with a degree of freedom independently of the wheels is not limited to the rotational motion. Alternatively, the forward and backward rocking motion may be performed by the corresponding translational motion of the upper body portion in the direction orthogonal to the axle of the moving body 100. The translational motion as well as the rotational motion may be performed, and both the motions may be combined with each other. As a result, the unstable operations due to the contact in the front-back direction of the moving body 100 can be more effectively reduced.

In the above description, the two-wheel moving body 100 has been described, but the number of wheels is not limited thereto. The present invention can be applied to a single-wheel moving body and a moving body having three or more wheels. Further, in the above description, the moving body 100 with the passenger seat 22 has been described, but the present invention can also be applied to a moving carriage for carrying an object. Also, the present invention can be applied to other moving bodies such as a mobile robot.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An inverted pendulum type moving body, comprising:
   first actuators to rotationally drive at least two wheels each disposed on an axle;
   a turning motion control portion to control the first actuators when the inverted pendulum type moving body comes into contact with an obstacle so as to allow the inverted pendulum type moving body to perform a turning motion, and
   a turning motion calculation portion programmed to calculate a forward and backward rocking motion generated due to a contact between the inverted pendulum type moving body and the obstacle, as a corresponding turning motion with respect to a direction in which the inverted pendulum type moving body turns,
   wherein the turning motion control portion drives and controls the first actuators to perform the turning motion so as to allow the inverted pendulum type moving body to turn and move backwards in a direction away from the obstacle when contact is made with the same.

2. The inverted pendulum type moving body according to claim 1, wherein the turning motion calculation portion calculates the turning motion based on an output of a sensor to measure variations that vary in accordance with a distance in a traveling direction between a position of the axle of each of the wheels and a position of a center of mass of an upper body portion of the inverted pendulum type moving body.

3. The inverted pendulum type moving body according to claim 1, further comprising:
   second actuators to drive an upper body portion of the inverted pendulum type moving body to vary a position of a center of mass of the upper body portion with respect to a position of the axle; and
   a posture control portion to control the second actuators to incline the upper body portion so that a side of a turning center becomes lower than a ground surface on which the wheels are located.

4. An inverted pendulum type moving body, comprising:
   first actuators to rotationally drive at least two wheels each disposed on an axle;
   a pair of second actuators to rotationally drive a pedestal of an upper body portion of the inverted pendulum type moving body at a position of a center of mass of the upper body portion about an axis parallel to the axle, one actuator of the pair of second actuators being located on one side of the pedestal, and the other actuator of the pair of second actuators being located on an opposite side of the pedestal;

a rotational motion calculation portion programmed to calculate a forward and backward rocking motion of the inverted pendulum type moving body, which is generated due to a contact between the inverted pendulum type moving body and the obstacle, as a corresponding rotational motion of the upper body portion about the axis parallel to the axle of the inverted pendulum type moving body; and a rotational motion control portion to drive and control the second actuators to allow the upper body portion to perform the rotational motion so that the forward and backward rocking motion is cancelled out by the rotational motion.

5. The inverted pendulum type moving body according to claim 4, wherein the rotational motion calculation portion calculates the rotational motion based on an output of a sensor to measure variations that vary in accordance with a distance in a traveling direction between a position of the axle of each of the wheels and the position of the center of mass of the upper body portion.

6. An inverted pendulum type moving body comprising:
first actuators to rotationally drive at least two wheels each disposed on an axle;
a pair of second actuators to translationally drive a pedestal of an upper body portion of the inverted pendulum type moving body at a position of a center of mass of the upper body portion about an axis orthogonal to the axle, one actuator of the pair of second actuators being located on one side of the pedestal, and the other actuator of the pair of second actuators being located on an opposite side of the pedestal;
a translational motion calculation portion programmed to calculate a forward and backward rocking motion of the inverted pendulum type moving body, which is generated due to a contact between the inverted pendulum type moving body and an obstacle, as a corresponding translational motion of the upper body portion in a direction orthogonal to the axle of the inverted pendulum type moving body; and
a translational motion control portion to drive and control the second actuators to allow the upper body portion to perform the translational motion so that the forward and backward rocking motion is cancelled out by the translational motion.

7. The inverted pendulum type moving body according to claim 6, wherein the translational motion calculation portion calculates the translational motion based on an output of a sensor to measure variations that vary in accordance with a distance in a traveling direction between a position of the axle of each of the wheels and the position of the center of mass of the upper body portion.

8. An inverted pendulum type moving body comprising:
first actuators to rotationally drive at least two wheels each disposed on an axle;
a pair of second actuators to translationally drive a pedestal of an upper body portion of the inverted pendulum type moving body at a position of a center of mass of the upper body in at least one of a direction about an axis parallel to the axle and a direction orthogonal to the axle, one actuator of the pair of second actuators being located on one side of the pedestal, and the other actuator of the pair of second actuators being located on an opposite side of the pedestal;
a rotational motion calculation portion programmed to calculate a forward and backward rocking motion of the inverted pendulum type moving body, which is generated due to a contact between the inverted pendulum type moving body and an obstacle, as a corresponding rotational motion of the upper body portion about the axis parallel to the axle of the inverted pendulum type moving body;
a rotational motion control portion to drive and control the second actuators to allow the upper body portion to perform the rotational motion so that the forward and backward rocking motion is cancelled out by the rotational motion;
a translational motion calculation portion to calculate the forward and backward rocking motion of the inverted pendulum type moving body, which is generated due to the contact, as a corresponding translational motion of the upper body portion in the direction orthogonal to the axle of the inverted pendulum type moving body; and
a translational motion control portion to drive and control the second actuators to allow the upper body portion to perform the translational motion so that the forward and backward rocking motion is cancelled out by the translational motion.

9. The inverted pendulum type moving body according to claim 2, wherein the sensor is a gyro-sensor to detect an inclination angle velocity of the upper body portion as the variations.

10. The inverted pendulum type moving body according to claim 1, further comprising a contact determination portion to determine whether the inverted pendulum type moving body comes into contact with the obstacle.

11. The inverted pendulum type moving body according to claim 10, wherein the contact determination portion determines the contact based on an output of an encoder to measure a current position of the inverted pendulum type moving body based on a rotation amount of the wheels.

12. A method of controlling an inverted pendulum type moving body to rotationally drive at least two wheels each disposed on an axle, comprising allowing the inverted pendulum type moving body to turn when the inverted pendulum type moving body comes into contact with an obstacle;
calculating, on a processor, a forward and backward rocking motion generated due to a contact between the inverted pendulum type moving body and the obstacle, as a corresponding turning motion in a direction in which the inverted pendulum type moving body turns; and
allowing the inverted pendulum type moving body to turn so as to perform the turning motion and move backwards in a direction away from the obstacle when contact is made with same.

13. The method of controlling an inverted pendulum type moving body according to claim 12, further comprising:
measuring variations that vary in accordance with a distance in a traveling direction between a position of the axle of each of the wheels and a position of a center of mass of an upper body portion of the inverted pendulum type moving body; and
calculating the turning motion based on an output of the variations measured.

14. The method of controlling an inverted pendulum type moving body according to claim 12, further comprising:
driving an upper body portion of the inverted pendulum type moving body and varying a position of a center of mass of the upper body portion with respect to a position of the axle so as to incline the upper body portion so that a side of a turning center becomes lower than a ground surface on which the wheels are located.

15. A method of controlling an inverted pendulum type moving body to rotationally drive at least two wheels each disposed on an axle and to rotationally drive an upper body portion of the inverted pendulum type moving body at a position of a center of mass of the upper body portion about an axis parallel to the axle, the method comprising:

rotationally driving at least two wheels each disposed on an axle with first actuators;

rotationally driving a pedestal of an upper body portion of the inverted pendulum type moving body at a position of a center of mass of the upper body portion about an axis parallel to the axle with a pair of second actuators, one actuator of the pair of second actuators being located on one side of the pedestal, and the other actuator of the pair of second actuators being located on an opposite side of the pedestal;

calculating, on a processor, a forward and backward rocking motion of the inverted pendulum type moving body, which is generated due to a contact between the inverted pendulum type moving body and an obstacle, as a corresponding rotational motion of the upper body portion about the axis parallel to the axle of the inverted pendulum type moving body; and allowing the upper body portion of the inverted pendulum type moving body to perform the rotational motion at the position of the center of mass of the upper body portion about the axis parallel to the axle so that the forward and backward rocking motion is cancelled out by the rotational motion.

16. The method of controlling an inverted pendulum type moving body according to claim 15, wherein, in the calculation of the rotational motion, the rotational motion is calculated based on an output of a sensor to measure variations that vary in accordance with a distance in a traveling direction between a position of the axle of each of the wheels and the position of the center of mass of the upper body portion.

17. A method of controlling an inverted pendulum type moving body to rotationally drive at least two wheels each disposed on an axle and to allow an upper body portion of the inverted pendulum type moving body at a position of a center of mass of the upper body portion in a direction orthogonal to the axle, the method comprising:

rotationally driving at least two wheels each disposed on an axle with first actuators;

translationally driving a pedestal of an upper body portion of the inverted pendulum type moving body at a position of a center of mass of the upper body portion about an axis parallel to the axle with a pair of second actuators, one actuator of the pair of second actuators being located on one side of the pedestal, and the other actuator of the pair of second actuators being located on an opposite side of the pedestal;

calculating, on a processor, a forward and backward rocking motion of the inverted pendulum type moving body, which is generated due to a contact between the inverted pendulum type moving body and an obstacle, as a corresponding translational motion of the upper body portion in the direction orthogonal to the axle of the inverted pendulum type moving body; and allowing the upper body portion of the inverted pendulum type moving body to perform the translational motion in the direction orthogonal to the axle so that the forward and backward rocking motion is cancelled out by the translational motion.

18. The method of controlling an inverted pendulum type moving body according to claim 17, wherein, in the calculation of the translational motion, the translational motion is calculated based on an output of a sensor to measure variations that vary in accordance with a distance in a traveling direction between a position of the axle of each of the wheels and the position of the center of mass of the upper body portion.

19. A method of controlling an inverted pendulum type moving body to rotationally drive at least two wheels each disposed on an axle and to allow an upper body portion of the inverted pendulum type moving body to perform one of rotation and translational driving at a position of a center of mass of the upper body portion in at least one of a direction about an axis parallel to the axle and a direction orthogonal to the axle, the method comprising:

rotationally driving at least two wheels each disposed on an axle with first actuators;

rotationally and translationally driving a pedestal of an upper body portion of the inverted pendulum type moving body at a position of a center of mass of the upper body portion about an axis parallel to the axle with a pair of second actuators, one actuator of the pair of second actuators being located on one side of the pedestal, and the other actuator of the pair of second actuators being located on an opposite side of the pedestal;

calculating, on a processor, a forward and backward rocking motion of the inverted pendulum type moving body, which is generated due to a contact between the inverted pendulum type moving body and an obstacle, as a corresponding rotational motion of the upper body portion about the axis parallel to the axle of the inverted pendulum type moving body;

allowing the upper body portion of the inverted pendulum type moving body to perform the rotational motion at the position of the center of mass of the upper body portion about the axis parallel to the axle so that the forward and backward rocking motion is cancelled out by the rotational motion;

calculating the forward and backward rocking motion of the inverted pendulum type moving body, which is generated due to the contact, as a corresponding translational motion of the upper body portion in the direction orthogonal to the axle of the inverted pendulum type moving body; and allowing the upper body portion of the inverted pendulum type moving body to perform the translational motion at the position of the center of mass of the upper body portion in the direction orthogonal to the axle so that the forward and backward rocking motion is cancelled out by the translational motion.

20. The method of controlling an inverted pendulum type moving body according to claim 13, wherein an inclination angle velocity of the upper body portion is detected as the variations.

21. The method of controlling an inverted pendulum type moving body according to claim 12, further comprising determining whether the inverted pendulum type moving body comes into contact with the obstacle.

22. The method of controlling an inverted pendulum type moving body according to claim 21, wherein:

a current position of the inverted pendulum type moving body is measured based on a rotation amount of the wheels; and the contact is determined based on the current position measured.

23. The inverted pendulum type moving body according to claim 5, wherein the sensor is a gyro-sensor to detect an inclination angle velocity of the upper body portion as the variations.

24. The inverted pendulum type moving body according to claim 7, wherein the sensor is a gyro-sensor to detect an inclination angle velocity of the upper body portion as the variations.

25. The inverted pendulum type moving body according to claim 4, further comprising a contact determination portion to determine whether the inverted pendulum type moving body comes into contact with the obstacle.

26. The inverted pendulum type moving body according to claim 6, further comprising a contact determination portion to determine whether the inverted pendulum type moving body comes into contact with the obstacle.

27. The inverted pendulum type moving body according to claim 8, further comprising a contact determination portion to determine whether the inverted pendulum type moving body comes into contact with the obstacle.

28. The inverted pendulum type moving body according to claim 25, wherein the contact determination portion determines the contact based on an output of an encoder to measure a current position of the inverted pendulum type moving body based on a rotation amount of the wheels.

29. The inverted pendulum type moving body according to claim 26, wherein the contact determination portion determines the contact based on an output of an encoder to measure a current position of the inverted pendulum type moving body based on a rotation amount of the wheels.

30. The inverted pendulum type moving body according to claim 27, wherein the contact determination portion determines the contact based on an output of an encoder to measure a current position of the inverted pendulum type moving body based on a rotation amount of the wheels.

31. The method of controlling an inverted pendulum type moving body according to claim 16, wherein an inclination angle velocity of the upper body portion is detected as the variations.

32. The method of controlling an inverted pendulum type moving body according to claim 18, wherein an inclination angle velocity of the upper body portion is detected as the variations.

33. The method of controlling an inverted pendulum type moving body according to claim 15, further comprising determining whether the inverted pendulum type moving body comes into contact with the obstacle.

34. The method of controlling an inverted pendulum type moving body according to claim 17, further comprising determining whether the inverted pendulum type moving body comes into contact with the obstacle.

35. The method of controlling an inverted pendulum type moving body according to claim 19, further comprising determining whether the inverted pendulum type moving body comes into contact with the obstacle.

36. The method of controlling an inverted pendulum type moving body according to claim 33, wherein:
a current position of the inverted pendulum type moving body is measured based on a rotation amount of the wheels; and
the contact is determined based on the current position measured.

37. The method of controlling an inverted pendulum type moving body according to claim 34, wherein:
a current position of the inverted pendulum type moving body is measured based on a rotation amount of the wheels; and
the contact is determined based on the current position measured.

38. The method of controlling an inverted pendulum type moving body according to claim 35, wherein:
a current position of the inverted pendulum type moving body is measured based on a rotation amount of the wheels; and
the contact is determined based on the current position measured.

* * * * *